(12) United States Patent
Feith et al.

(10) Patent No.: US 8,628,032 B2
(45) Date of Patent: Jan. 14, 2014

(54) LOW FLOW IRRIGATION EMITTER

(75) Inventors: Raymond P. Feith, Chino Hills, CA (US); Jeffrey Lee Mattlin, Pasadena, CA (US)

(73) Assignee: Rain Bird Corporation, Azusa, CA (US)

( * ) Notice: Subject to any disclaimer, the term of this patent is extended or adjusted under 35 U.S.C. 154(b) by 778 days.

(21) Appl. No.: 12/347,266

(22) Filed: Dec. 31, 2008

(65) Prior Publication Data

US 2010/0163651 A1 Jul. 1, 2010

(51) Int. Cl.
*B05B 15/00* (2006.01)

(52) U.S. Cl.
USPC .......................................... 239/542; 239/571

(58) Field of Classification Search
USPC .................. 239/542, 547, 569, 576, 589
See application file for complete search history.

(56) References Cited

U.S. PATENT DOCUMENTS

| | | |
|---|---|---|
| 2,174,515 A | 10/1939 | Hughes |
| 2,449,731 A | 9/1948 | Therrien |
| 2,625,429 A | 1/1953 | Coles |
| 2,639,194 A | 5/1953 | Wahlin |
| 2,794,321 A | 6/1957 | Warner et al. |
| 2,970,923 A | 2/1961 | Sparmann |
| 3,155,612 A | 11/1964 | Weber |
| 3,182,916 A | 5/1965 | Schulz |
| 3,323,550 A | 6/1967 | Lee |
| 3,420,064 A | 1/1969 | Blass et al. |
| 3,434,500 A | 3/1969 | Burrows |
| 3,467,142 A | 9/1969 | Boyle et al. |
| 3,586,291 A | 6/1971 | Malec |
| 3,697,002 A | 10/1972 | Parkison |
| 3,729,142 A | 4/1973 | Rangel-Garza et al. |

(Continued)

FOREIGN PATENT DOCUMENTS

| | | |
|---|---|---|
| WO | 9205689 | 4/1992 |
| WO | 9955141 | 11/1999 |

(Continued)

OTHER PUBLICATIONS

Office Action mailed Jul. 30, 1999 for U.S. Appl. No. 08/607,850 (6 pages).

(Continued)

*Primary Examiner* — Davis Hwu
(74) *Attorney, Agent, or Firm* — Fitch Even Tabin & Flannery LLP

(57) ABSTRACT

An irrigation emitter is provided for delivering irrigation water from a water supply conduit, such as an irrigation supply tube, pipe, or other water supply apparatus, at a low volume or drip-like flow rate. The emitter operates generally through the use of a relatively long flow channel that causes a pressure reduction between the water supply conduit and an emitter outlet. The emitter includes an inlet component for tapping a portion of the water flow from the water supply conduit and, when the water pressure is above a predetermined minimum level, directing the flow to and through the flow channel for subsequent discharge to a desired location. The emitter also may regulate to accommodate for changes in supply pressure. The emitter also may include automatic flushing to dislodge debris trapped within the emitter.

12 Claims, 16 Drawing Sheets

(56) References Cited

U.S. PATENT DOCUMENTS

| | | | |
|---|---|---|---|
| 3,753,527 A | 8/1973 | Galbraith et al. | |
| 3,777,980 A | 12/1973 | Allport | |
| 3,780,946 A | 12/1973 | Smith et al. | |
| 3,791,587 A | 2/1974 | Drori | |
| 3,804,334 A | 4/1974 | Curry | |
| 3,807,430 A * | 4/1974 | Keller | 137/504 |
| 3,814,377 A * | 6/1974 | Todd | 251/145 |
| 3,815,636 A | 6/1974 | Menzel | |
| 3,851,896 A | 12/1974 | Olson | |
| 3,863,845 A | 2/1975 | Bumpstead | |
| 3,882,892 A | 5/1975 | Menzel | |
| 3,981,452 A | 9/1976 | Eckstein | |
| 3,998,244 A | 12/1976 | Bentley | |
| 4,036,435 A | 7/1977 | Pecaro | |
| 4,037,791 A | 7/1977 | Mullett et al. | |
| 4,084,749 A | 4/1978 | Drori | |
| 4,105,162 A | 8/1978 | Drori | |
| 4,161,291 A | 7/1979 | Bentley | |
| 4,177,947 A | 12/1979 | Menzel | |
| 4,196,853 A | 4/1980 | Delmer | |
| 4,209,133 A | 6/1980 | Mehoudar | |
| 4,210,287 A | 7/1980 | Mehoudar | |
| 4,223,838 A | 9/1980 | Maria-Vittorio-Torrisi | |
| 4,226,368 A | 10/1980 | Hunter | |
| 4,235,380 A | 11/1980 | Delmer | |
| 4,250,915 A | 2/1981 | Rikuta | |
| 4,274,597 A | 6/1981 | Dobos et al. | |
| 4,307,841 A | 12/1981 | Mehoudar | |
| 4,331,293 A | 5/1982 | Rangel-Garza | |
| 4,354,639 A | 10/1982 | Delmer | |
| 4,369,923 A | 1/1983 | Bron | |
| 4,384,680 A | 5/1983 | Mehoudar | |
| 4,413,786 A | 11/1983 | Mehoudar | |
| 4,430,020 A | 2/1984 | Robbins | |
| 4,508,140 A | 4/1985 | Harrison | |
| 4,513,777 A | 4/1985 | Wright | |
| 4,519,546 A | 5/1985 | Gorney et al. | |
| 4,573,640 A | 3/1986 | Mehoudar | |
| 4,613,080 A | 9/1986 | Benson et al. | |
| 4,627,903 A | 12/1986 | Chapman et al. | |
| 4,653,695 A | 3/1987 | Eckstein | |
| 4,687,143 A | 8/1987 | Gorney et al. | |
| 4,718,608 A | 1/1988 | Mehoudar | |
| 4,726,527 A | 2/1988 | Mendenhall | |
| 4,753,394 A | 6/1988 | Goodman | |
| 4,789,005 A | 12/1988 | Griffiths | |
| 4,796,660 A | 1/1989 | Bron | |
| 4,817,875 A | 4/1989 | Karmeli et al. | |
| 4,824,019 A | 4/1989 | Lew | |
| 4,824,025 A | 4/1989 | Miller | |
| 4,856,552 A | 8/1989 | Hiemstra | |
| 4,874,132 A | 10/1989 | Gilead | |
| 4,880,167 A | 11/1989 | Langa et al. | |
| 4,909,411 A * | 3/1990 | Uchida et al. | 220/62.22 |
| 5,022,940 A | 6/1991 | Mehoudar | |
| 5,031,837 A | 7/1991 | Hanish | |
| 5,040,770 A | 8/1991 | Rajster et al. | |
| 5,052,625 A | 10/1991 | Ruskin | |
| 5,096,206 A | 3/1992 | Andre et al. | |
| 5,111,995 A | 5/1992 | Dumitrascu et al. | |
| 5,111,996 A | 5/1992 | Eckstein | |
| 5,118,042 A | 6/1992 | Delmer | |
| 5,122,044 A | 6/1992 | Mehoudar | |
| 5,137,216 A | 8/1992 | Hanish | |
| 5,163,622 A | 11/1992 | Cohen | |
| 5,183,208 A | 2/1993 | Cohen | |
| 5,192,027 A | 3/1993 | Delmer et al. | |
| 5,207,386 A | 5/1993 | Mehoudar | |
| 5,232,160 A | 8/1993 | Hendrickson et al. | |
| 5,252,162 A | 10/1993 | Delmer | |
| 5,271,786 A | 12/1993 | Gorney | |
| 5,279,462 A | 1/1994 | Mehoudar | |
| 5,282,578 A | 2/1994 | DeFrank | |
| 5,282,916 A | 2/1994 | Bloom | |
| 5,283,916 A | 2/1994 | Haro | |
| 5,324,371 A | 6/1994 | Mehoudar | |
| 5,327,941 A | 7/1994 | Bitsakis et al. | |
| 5,330,107 A | 7/1994 | Karathanos | |
| 5,364,032 A | 11/1994 | DeFrank | |
| 5,375,768 A * | 12/1994 | Clark | 239/210 |
| 5,400,973 A | 3/1995 | Cohen | |
| 5,441,203 A | 8/1995 | Swan et al. | |
| 5,443,212 A | 8/1995 | Dinur | |
| 5,535,778 A | 7/1996 | Zakai | |
| 5,586,727 A | 12/1996 | Shekalim | |
| 5,609,303 A | 3/1997 | Cohen | |
| 5,615,833 A | 4/1997 | Robillard et al. | |
| 5,615,838 A | 4/1997 | Eckstein et al. | |
| 5,628,462 A | 5/1997 | Miller | |
| 5,634,594 A | 6/1997 | Cohen | |
| 5,636,797 A | 6/1997 | Cohen | |
| 5,676,897 A | 10/1997 | Dermitzakis | |
| 5,732,887 A | 3/1998 | Roberts | |
| 5,744,779 A | 4/1998 | Buluschek | |
| 5,820,028 A | 10/1998 | Dinur | |
| 5,820,029 A * | 10/1998 | Marans | 239/542 |
| 5,829,685 A | 11/1998 | Cohen | |
| 5,829,686 A | 11/1998 | Cohen | |
| 5,855,324 A | 1/1999 | DeFrank et al. | |
| 5,875,815 A | 3/1999 | Ungerecht et al. | |
| 5,944,260 A | 8/1999 | Wang | |
| 5,957,391 A | 9/1999 | DeFrank et al. | |
| 6,015,102 A | 1/2000 | Daigle et al. | |
| 6,026,850 A | 2/2000 | Newton et al. | |
| 6,027,048 A | 2/2000 | Mehoudar | |
| 6,039,270 A | 3/2000 | Dermitzakis | |
| 6,062,245 A | 5/2000 | Berglind et al. | |
| 6,095,185 A | 8/2000 | Rosenberg | |
| 6,109,296 A | 8/2000 | Austin | |
| 6,179,949 B1 | 1/2001 | Buluschek | |
| 6,180,162 B1 | 1/2001 | Shigeru et al. | |
| 6,206,305 B1 | 3/2001 | Mehoudar | |
| 6,213,408 B1 | 4/2001 | Shekalim | |
| 6,238,081 B1 | 5/2001 | Sand | |
| 6,250,571 B1 | 6/2001 | Cohen | |
| 6,280,554 B1 | 8/2001 | Lambert et al. | |
| 6,302,338 B1 | 10/2001 | Cohen | |
| 6,371,390 B1 | 4/2002 | Cohen | |
| 6,382,530 B1 | 5/2002 | Perkins | |
| 6,394,412 B2 | 5/2002 | Zakai et al. | |
| 6,403,013 B1 | 6/2002 | Man | |
| 6,460,786 B1 | 10/2002 | Roberts | |
| 6,461,468 B1 | 10/2002 | Cohen | |
| 6,461,486 B2 | 10/2002 | Lorincz et al. | |
| 6,464,152 B1 | 10/2002 | Bolinis et al. | |
| 6,499,872 B2 | 12/2002 | Sand | |
| 6,557,819 B2 | 5/2003 | Austin | |
| 6,561,443 B2 | 5/2003 | Delmer | |
| 6,568,607 B2 | 5/2003 | Boswell et al. | |
| 6,581,854 B2 | 6/2003 | Eckstein et al. | |
| 6,581,902 B2 | 6/2003 | Michau et al. | |
| 6,622,946 B2 | 9/2003 | Held et al. | |
| 6,736,337 B2 | 5/2004 | Vildibill et al. | |
| 6,817,548 B2 | 11/2004 | Krauth | |
| 6,827,298 B2 | 12/2004 | Sacks | |
| 6,886,761 B2 | 5/2005 | Cohen | |
| 6,896,758 B1 | 5/2005 | Giuffre | |
| 6,945,476 B2 | 9/2005 | Giuffre | |
| 7,270,280 B2 | 9/2007 | Belford | |
| 7,300,004 B2 | 11/2007 | Sinden et al. | |
| 7,363,938 B1 | 4/2008 | Newton | |
| 7,410,108 B2 | 8/2008 | Rabinowitz | |
| 7,455,094 B2 | 11/2008 | Lee | |
| 7,530,382 B2 | 5/2009 | Kertscher et al. | |
| 7,648,085 B2 | 1/2010 | Mavrakis et al. | |
| 7,681,805 B2 | 3/2010 | Belford et al. | |
| 7,681,810 B2 | 3/2010 | Keren | |
| 7,695,587 B2 | 4/2010 | Kertscher | |
| 7,735,758 B2 | 6/2010 | Cohen | |
| 7,775,237 B2 | 8/2010 | Keren | |
| 2002/0070297 A1 | 6/2002 | Bolinis et al. | |
| 2002/0074434 A1 | 6/2002 | Delmer | |
| 2002/0104902 A1 | 8/2002 | Eckstein et al. | |
| 2002/0104903 A1 | 8/2002 | Eckstein et al. | |

(56) References Cited

U.S. PATENT DOCUMENTS

| | | | |
|---|---|---|---|
| 2003/0029937 A1 | 2/2003 | Dermitzakis et al. | |
| 2003/0042335 A1 | 3/2003 | Krauth | |
| 2003/0057301 A1 | 3/2003 | Cohen | |
| 2003/0089409 A1 | 5/2003 | Morimoto | |
| 2003/0226913 A1* | 12/2003 | Brunnengraeber et al. | .. 239/542 |
| 2005/0029231 A1 | 2/2005 | Kertscher et al. | |
| 2005/0224607 A1 | 10/2005 | Dinur et al. | |
| 2005/0258278 A1 | 11/2005 | Cohen | |
| 2005/0258279 A1 | 11/2005 | Harrold | |
| 2005/0279866 A1 | 12/2005 | Belford | |
| 2005/0284966 A1 | 12/2005 | DeFrank | |
| 2006/0032949 A1 | 2/2006 | Lo | |
| 2006/0043219 A1 | 3/2006 | Raanan | |
| 2006/0144965 A1 | 7/2006 | Keren | |
| 2006/0163388 A1 | 7/2006 | Mari | |
| 2006/0186228 A1 | 8/2006 | Belford et al. | |
| 2006/0202381 A1 | 9/2006 | Bach et al. | |
| 2006/0237561 A1 | 10/2006 | Park et al. | |
| 2007/0095950 A1 | 5/2007 | Kim | |
| 2007/0187031 A1 | 8/2007 | Kertscher | |
| 2007/0194149 A1 | 8/2007 | Mavrakis et al. | |
| 2008/0041978 A1 | 2/2008 | Keren | |
| 2008/0067266 A1 | 3/2008 | Cohen | |
| 2008/0099584 A1 | 5/2008 | Raanan | |
| 2008/0105768 A1 | 5/2008 | Kertscher | |
| 2008/0237374 A1 | 10/2008 | Belford et al. | |
| 2008/0257991 A1 | 10/2008 | Einav et al. | |
| 2009/0020634 A1 | 1/2009 | Schweitzer et al. | |
| 2009/0078795 A1 | 3/2009 | Levitsky | |
| 2009/0145985 A1 | 6/2009 | Mayer et al. | |
| 2009/0165879 A1 | 7/2009 | Socolsky | |
| 2009/0173811 A1 | 7/2009 | Gorney et al. | |
| 2009/0243146 A1 | 10/2009 | Retter et al. | |
| 2009/0261183 A1 | 10/2009 | Mavrakis et al. | |
| 2010/0096478 A1 | 4/2010 | Mamo | |
| 2010/0096479 A1 | 4/2010 | Mamo | |
| 2010/0126974 A1 | 5/2010 | Kertscher | |
| 2010/0155508 A1 | 6/2010 | Keren | |
| 2010/0219265 A1 | 9/2010 | Feld | |
| 2010/0237170 A1 | 9/2010 | Rosenberg et al. | |
| 2010/0282873 A1 | 11/2010 | Mattlin et al. | |

FOREIGN PATENT DOCUMENTS

| | | |
|---|---|---|
| WO | 0010378 | 3/2000 |
| WO | 0030760 | 6/2000 |
| WO | 2007046105 A2 | 4/2007 |

OTHER PUBLICATIONS

Amendment dated Sep. 22, 1999 for U.S. Appl. No. 08/607,850 (6 pages).

Interview Summary dated Sep. 21, 1999 for U.S. Appl. No. 08/607,850 (1 page).

Request for Ex Parte Reexamination Transmittal Form dated Mar. 7, 2006 and Request for Reexamination of U.S. Patent No. 6,026,850 (13 pages).

Order Granting/Denying Request for Ex Parte Reexamination mailed Apr. 17, 2006 for U.S. Control No. 90/007,963 (13 pages).

U.S. Appl. No. 12/367,295, filed Feb. 6, 2009, to Kirk A. Allen, entitled "Low Flow Irrigation Emitter."

U.S. Appl. No. 12/347,266, filed Dec. 31, 2008, to Raymond P. Feith, entitled "Low Flow Irrigation Emitter".

Jaffe, E., Netafim Ltd., Patent Dept.; Letter with attached claim charts, Jul. 12, 2009, 4 pages.

Netafim Ltd., Appendix A, marked-up images of Netafirm's RAM product, 1 page.

Netafim Ltd., Appendix B, Invoice, Jan. 31, 1991, 1 page.

Netafim Ltd., Appendix C, Netafim RAM Catalog, Jan. 2000, 4 pages.

Netafim Ltd., Appendix D, Englarged, marked-up excerpts from Netafim RAM Catalog, Jan. 2000, 1 page.

Jaffe, E., Netafim Ltd., Patent Dept.; Letter with attached claim charts, Feb. 4, 2008, 6 pages.

Netafim Ltd., Appendix A, images of Netafim's Drip Net product, 1 page.

Hetzler, Mark W., Fitch, Even, Tabin & Flannery; Letter, Apr. 23, 2008, 1 page.

Jaffe, E., Netafim, Ltd., Patent Dept.; Letter with attached invoice May 7, 2008, 2 pages.

Jaffe, E., Netafim Ltd., Patent Dept.; Letter with attachment, Feb. 4, 2008, 7 pages.

U.S. Appl. No. 11/359,181, filed Feb. 22, 2006 and issued on Jan. 19, 2010 as U.S. Patent No. 7,648,085 entitled "Drip Emitter".

U.S. Appl. No. 12/495,178, filed Jun. 30, 2009, entitled "Drip Emitter," which is a continuation of U.S. Appl. No. 11/359,181.

U.S. Appl. No. 12/495,193, filed Jun. 30, 2009, entitled "Drip Emitter," which is a divisional of U.S. Appl. No. 11/359,181.

U.S. Appl. No. 12/436,394, filed May 6, 2009, entitled "Drip Emitter and Methods of Assembly and Mounting".

U.S. Appl. No. 11/394,755, filed Mar. 31, 2006, entitled "Drip Emitter".

Jaffe, E. Netafim Ltd., Patent Dept., Letter with attached Appendices A-B, Aug. 1, 2010, 35 pages.

* cited by examiner

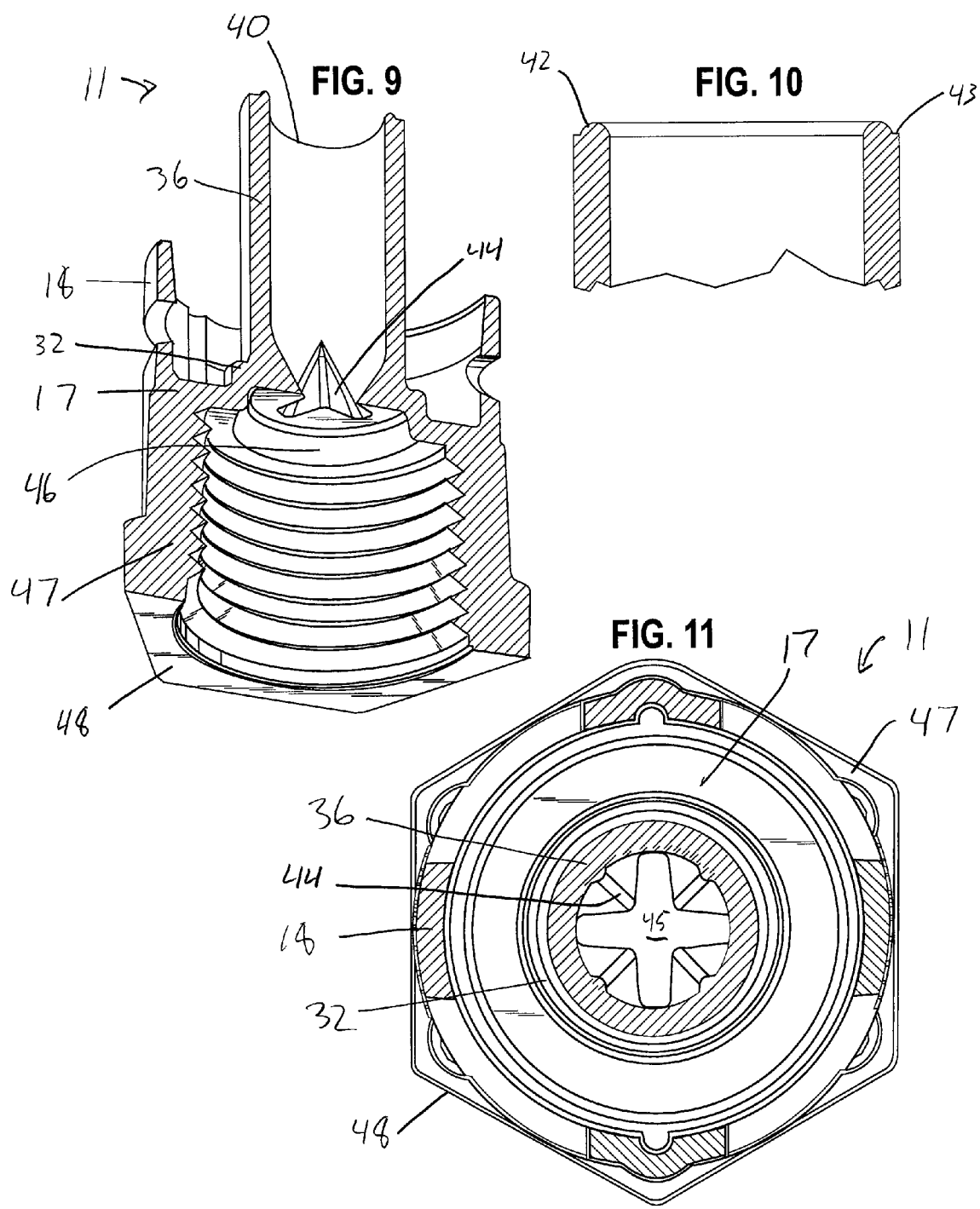

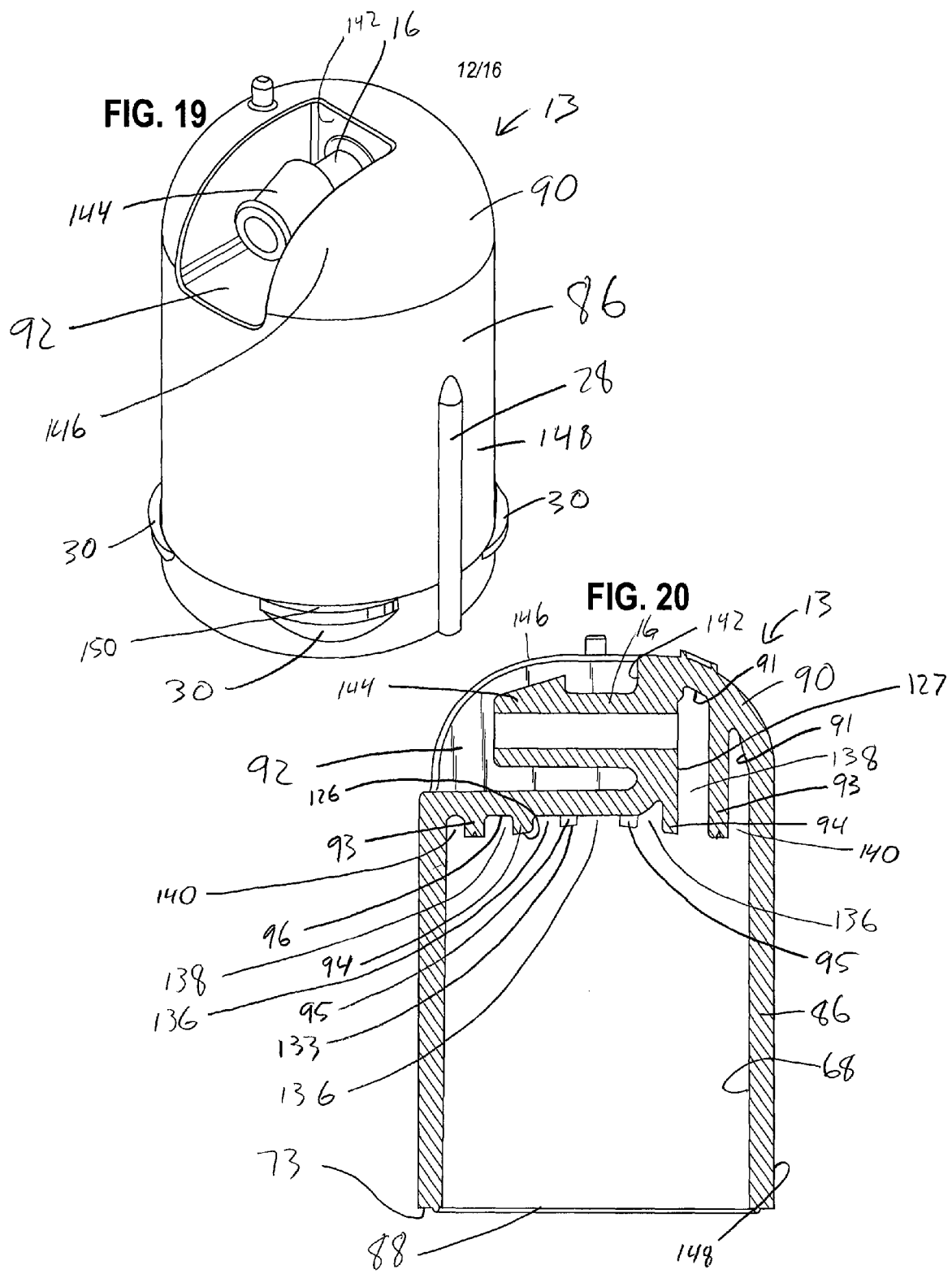

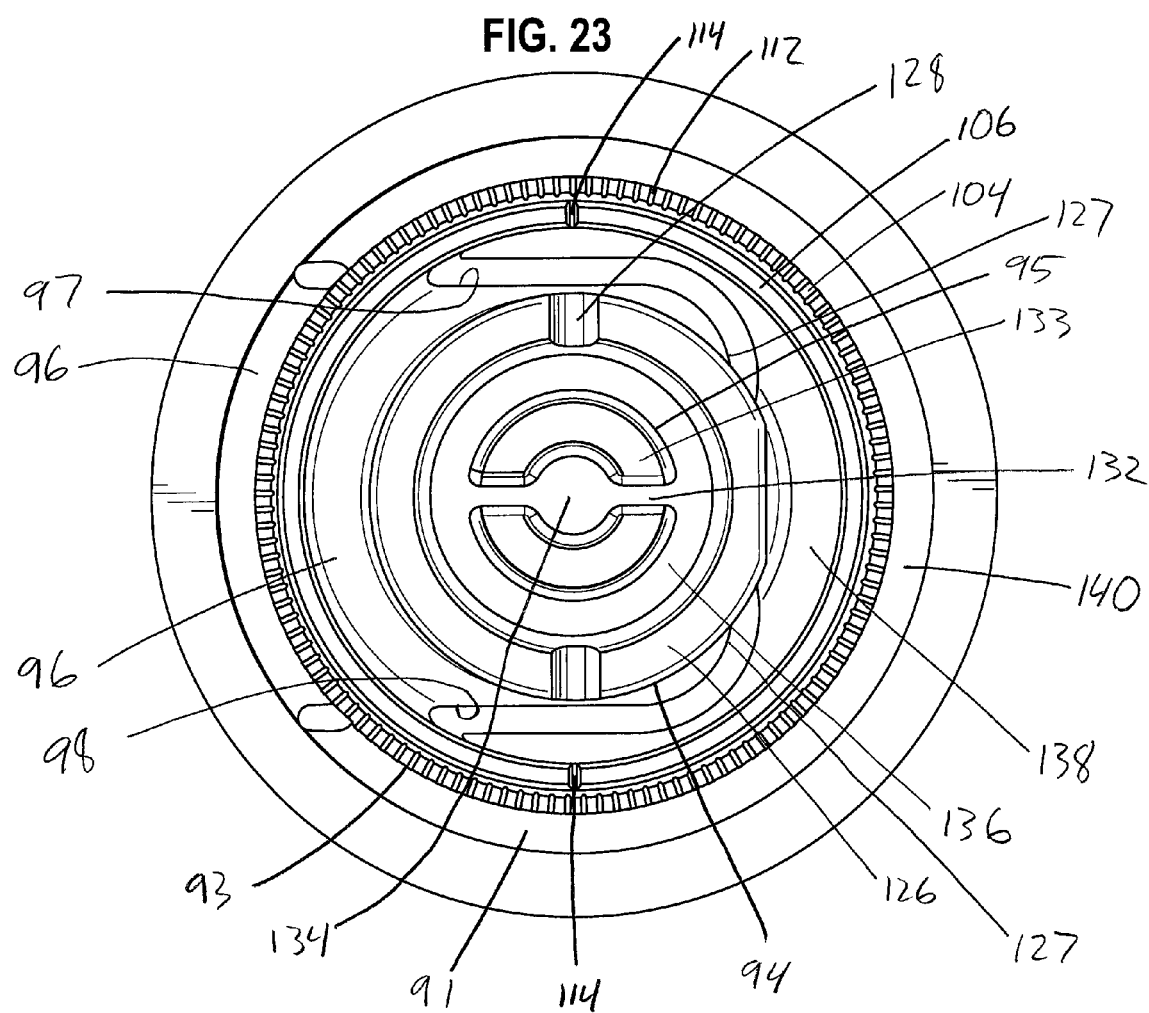

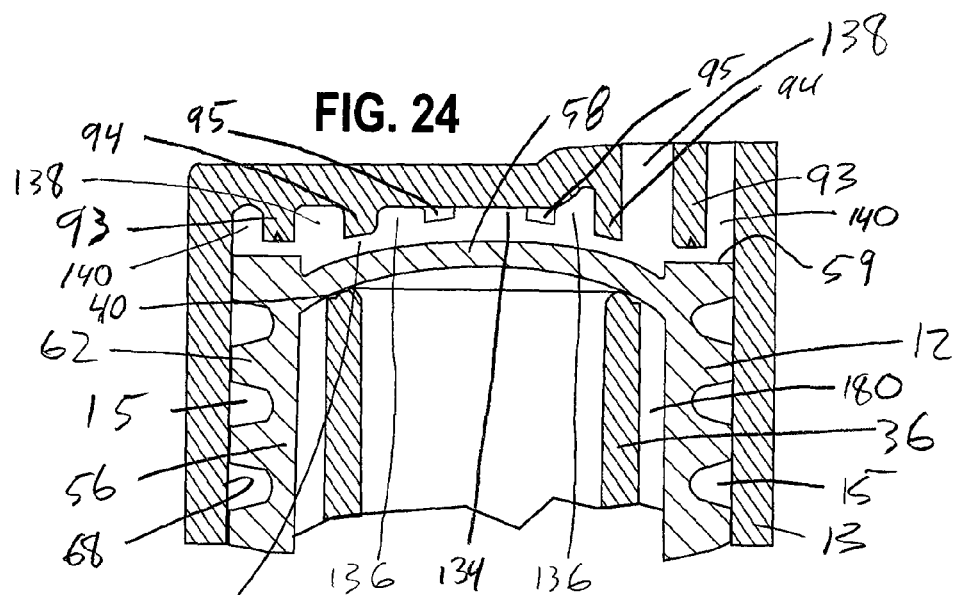
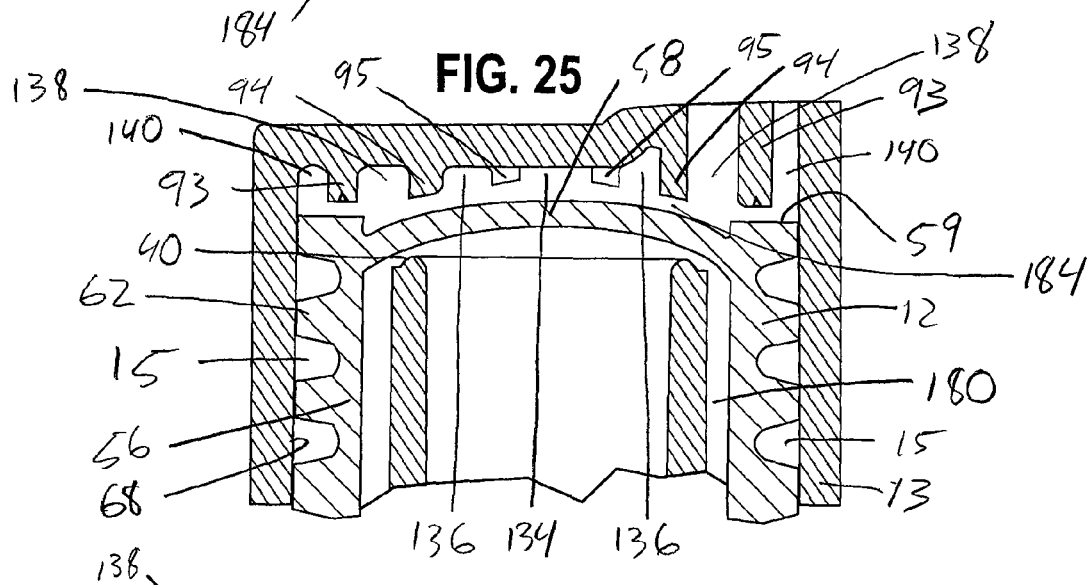
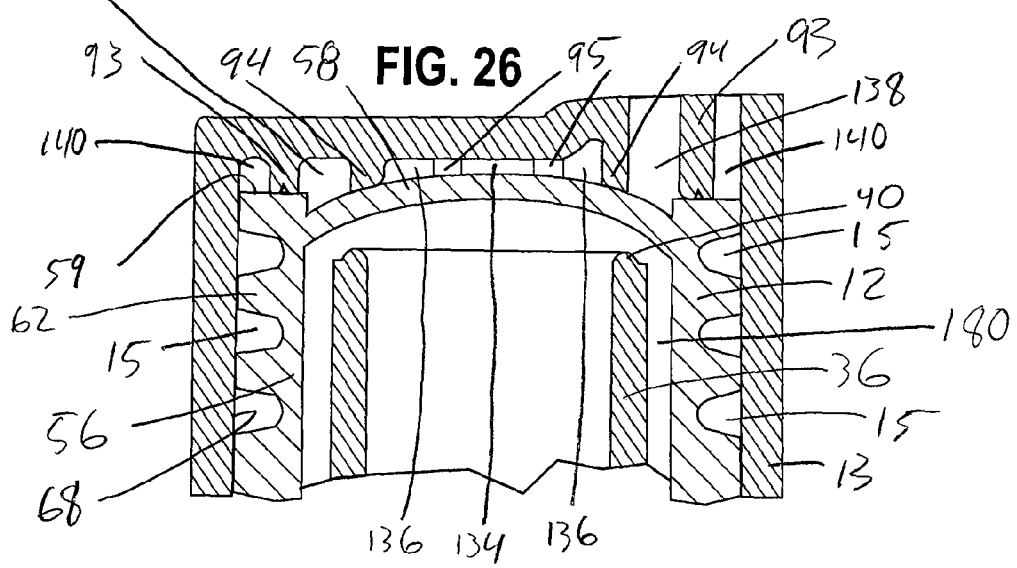

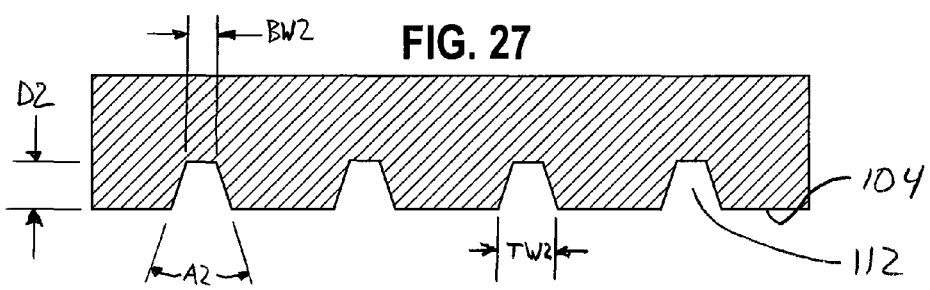
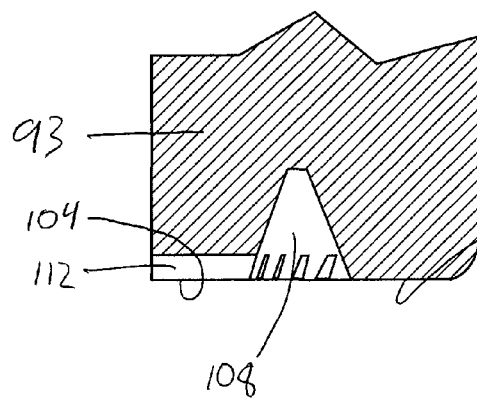
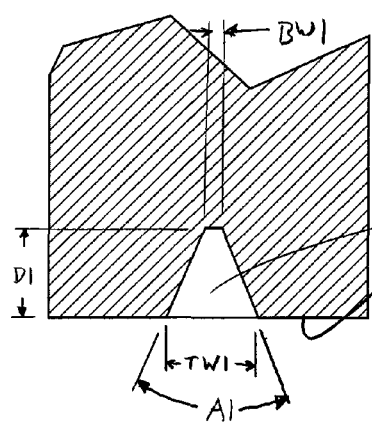
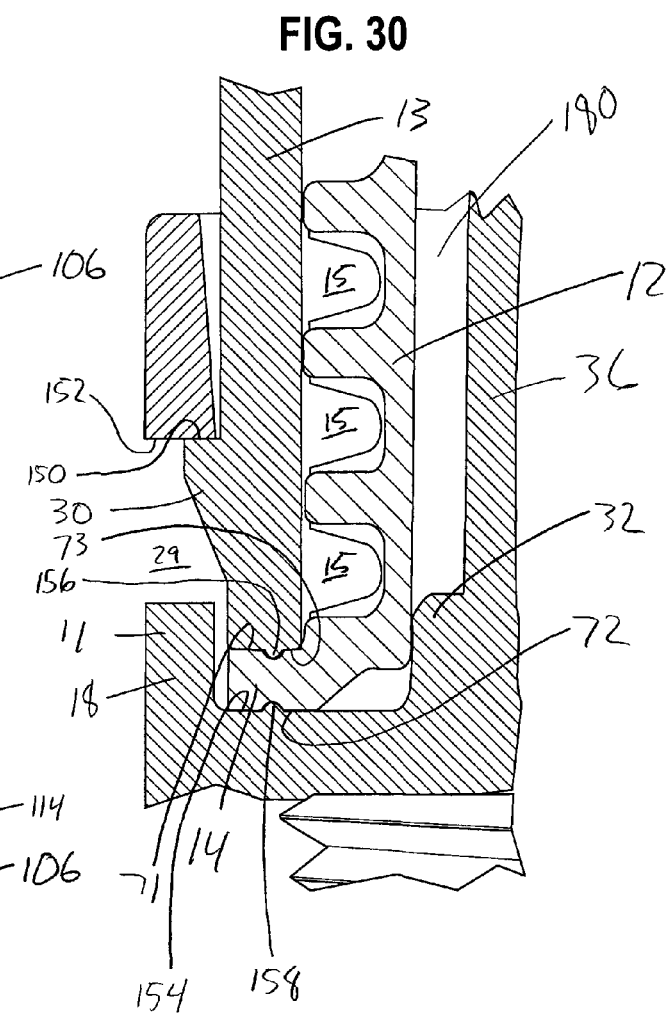

US 8,628,032 B2

LOW FLOW IRRIGATION EMITTER

FIELD

The present invention relates to irrigation and, more particularly, to low flow irrigation emitters.

BACKGROUND

Low flow irrigation emitters (also referred to as "drip emitters") are generally known in the art for use in delivering irrigation water at relatively low volume flow rate, thereby conserving water. Such irrigation devices commonly comprise an emitter housing connected to a water supply tube through which irrigation water is supplied under pressure. The drip irrigation device taps a portion of the relatively high pressure irrigation water from the supply tube for flow through a typically long or small cross-section flow path in the device to achieve a desired pressure drop prior to discharge at a drip-like flow rate. In a conventional system, a large number of the drip irrigation devices are mounted at selected positions along the length of the supply tube to deliver the irrigation water to a large number of specific points, such as directly to a plurality of individual plants or other vegetation.

Drip emitters can be installed either below ground ("subsurface") or above ground. Drip emitters, subsurface or above ground, provide numerous advantages over spray emitters located above ground. For example, subsurface emitters limit water loss due to runoff and evaporation which provides significant savings in water consumption. Further, drip emitters prevent the distribution of water to undesired terrain, such as roadways or walkways, created from "overspray." In contrast, spray emitters often generate overspray that disturbs vehicles and/or pedestrians and wastes water. Water also may be used more economically by directing it at precise locations of the root systems of plants or other desired locations above or below ground. Another advantage of subsurface emitters is being able to water an area while still being able to use the area. For instance, such emitters may be used to irrigate park or school grounds at any desired time. Spray emitters located above ground, on the other hand, may be undesirable at parks and school grounds during daytime hours when children or other individuals are present.

A further benefit is that subsurface emitters are not easily vandalized, given their underground installation. Thus, subsurface emitters result in reduced costs associated with replacing vandalized equipment and with monitoring for the occurrence of such vandalism. This is important particularly for publicly accessible areas, such as parks, school grounds, and landscaping around commercial buildings and parking lots. The above-identified benefits and advantages are only illustrative of the many benefits and advantages of subsurface and above ground drip emitters.

One known challenge with drip emitters is the ability to provide one that compensates for water pressure fluctuations in a reliable manner to provide a consistent low flow or drip rate. Such fluctuations result in the inefficient and wasteful use of water. Thus, there is a need to provide for a relatively constant drip flow output from drip emitters, regardless of fluctuations in the water pressure in the supply tube, with an emitter design that is economic to manufacture.

Another known challenge with drip emitters is to provide a design that does not clog. Clogging of an emitter may result from the introduction of grit, debris, or other particulate matter, both from debris entering the emitter through the supply tube and debris entering the emitter from the terrain being irrigated, i.e., "back siphoning." Such obstruction of an emitter may result in severe, and in some cases complete, flow restriction, potentially preventing the emitter from operating entirely. Many irrigation systems depend on the operation of each specifically situated emitter for sufficient water coverage to maintain healthy grass, crop, or other plant growth.

In the event that an emitter does become obstructed, there is a need for the emitter to be capable of self-flushing the obstruction. Without such ability, the emitter would have to be replaced or cleaned manually. Even more concerning is that the obstruction would not become apparent until the target of the emitter's water flow visibly suffered from lack of irrigation. This could result in the complete loss of the vegetation intended for irrigation. Accordingly, there is a need to prevent drip emitters from becoming obstructed.

BRIEF DESCRIPTION OF THE DRAWINGS

FIG. 9 is a perspective cross-section view of the inlet component of FIG. 7;

FIG. 10 is a partial cutout view of a cross-section of the inlet component of FIG. 7;

FIG. 11 is a top view of the inlet component of FIG. 7;

FIG. 19 is a perspective view of an outlet component of the drip emitters of FIGS. 1 and 5;

FIG. 20 is a cross-section view of the outlet component of FIG. 19.

FIG. 23 is a bottom view of the outlet component of FIG. 19;

FIG. 24 is a portion of the cross-section of FIG. 3 showing one operational condition;

FIG. 25 is the cross-section of FIG. 24 showing another operational condition;

FIG. 26 is the cross-section of FIG. 24 showing another operational condition;

FIG. 27 is an enlarged partial cutout, cross-section view of the outlet component of FIG. 19;

FIG. 28 is an enlarged partial cutout, cross-section view of the outlet component of FIG. 19;

FIG. 29 is an enlarged partial cutout, cross-section view of the outlet component of FIG. 19; and FIG. 30 is a partial cutout, cross-section view of the drip emitter of FIGS. 1 and 5.

DETAILED DESCRIPTION OF THE PREFERRED EMBODIMENTS

Figure 1:
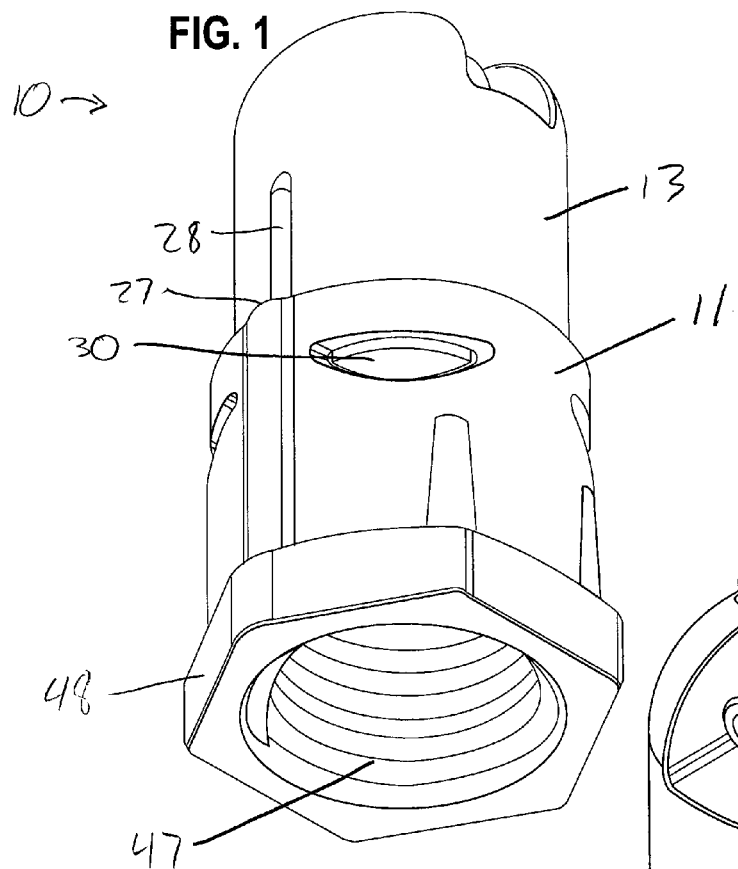
FIG. 1 is a perspective view of an assembled drip emitter embodying features of the present invention.

With reference to FIGS. 1-6, a drip irrigation emitter 10 is provided for delivering irrigation water from a water supply conduit (not shown), such as an irrigation supply tube, pipe, or other water supply apparatus, at a low volume, drip-like flow rate. The emitter 10 generally comprises an inlet component 11, a valve component 12, and an outlet component 13.

The inlet component 11, the valve component 12, and the outlet component 13 are generally assembled together such that the valve component 12 is disposed within the outlet component 13 and the outlet component 13 is interlocked with the inlet component 11. The valve component 12 is generally held in place by a flange 14 that is generally compressed between the inlet component 11 and the outlet component 13. The valve component 12 cooperates with the outlet component 13 to define a relatively long labyrinth flow channel 15. The emitter 10 generally converts relatively high supply pressure to a relatively low supply pressure through the use of the flow channel 15 that causes a pressure reduction between the water supply conduit and an emitter outlet 16.

As shown in FIGS. 7-11, the inlet component 11 includes a base 17. An outer casing 18 extends generally perpendicularly from the base 17. In a preferred embodiment, the outer casing 18 has a generally cylindrical shape. In an alternative embodiment, the outer casing 18 could have a generally polygonal shaped cross section having a plurality of inner surfaces and outer surfaces rather than the generally smooth surfaces of a cylinder. In a preferred embodiment, the outer casing 18 includes an inner surface 19 having a slightly outwardly tapered end portion 20. The outer casing 18 also includes at least one longitudinally extending alignment slot 27, preferably two, running generally parallel to the central axis of the inlet component 11. Each slot 27 receives a corresponding rib 28 protruding from the outlet component 13. The outer casing 18 defines a plurality of coupling openings 29. Each coupling opening 29 receives a corresponding coupling tab 30 of the outlet component 13, as shown in FIGS. 1, 2, and 4-6, to lock the inlet component 11 and the outlet component 13 together. In a preferred embodiment, there are four coupling openings 29 having a generally arcuate semicircular shape. Alternatively, the coupling openings 29 could have any other shape that cooperates with the corresponding tabs 30 to lock the inlet component 11 and outlet component 13 together.

The inlet component 11 includes an annular valve locating step 32 that extends from the base 17. The inlet component 11 further includes an inlet tube 36 extending generally axially from the valve locating step 32 and is generally coaxial with the central axis of the inlet component 11. The base 17, the locating step 32, and the inlet tube 36 are preferably integrally formed. The inlet component 11 is preferably made from a sturdy and non-corrosive material.

Figure 8:
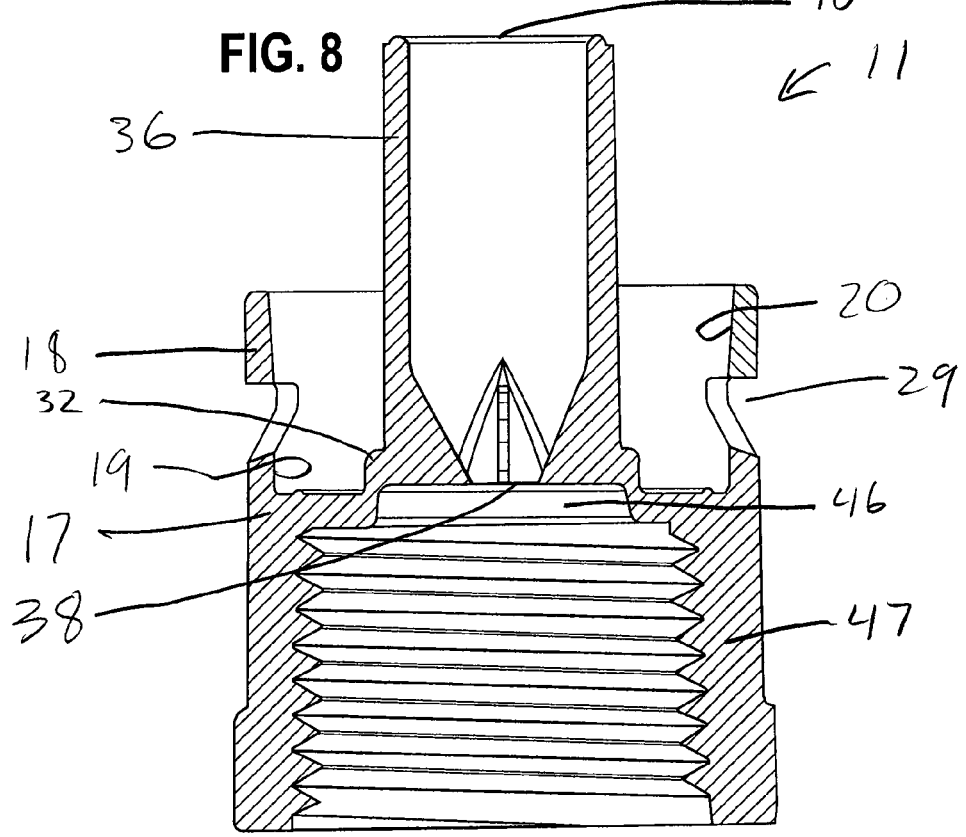
FIG. 8 is a cross-section view of the inlet component of FIG. 7.
Figure 12:
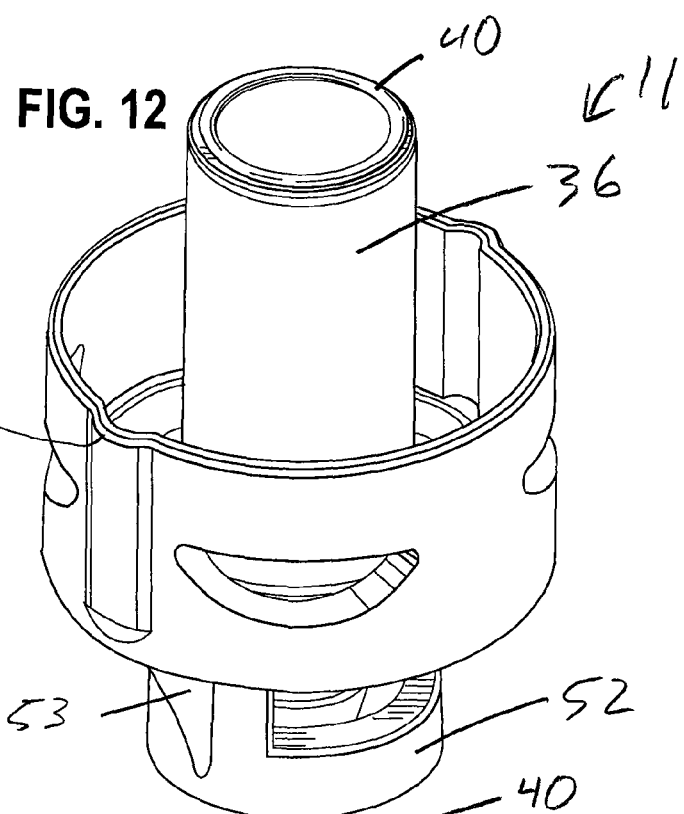
FIG. 12 is a perspective view of an inlet component of the drip emitter of FIG. 5.

The inlet tube 36 has inlet end 38 for water to enter and an outlet end 40 for water to exit the inlet tube 36 during operation. In a preferred embodiment, the inlet tube 36 is generally cylindrical. In an alternative embodiment, the inlet tube 36 could have a generally polygonal shaped cross-section. The outlet end 40 includes a generally round bead-like lip 42 (FIG. 10). The outlet end 40 further includes an annular ledge 43 located radially outward of the lip 42. At the inlet end 38 are restrictor protrusions 44 having a generally pyramidal shape (FIGS. 9 and 10). In a preferred embodiment, there are four restrictor protrusions 44; however, other quantities would suffice. The restrictor protrusions 44 are integrally formed with the inlet tube 36. When four restrictor protrusions 44 are used, they define a generally cross-shaped opening 45 (FIG. 11). The inlet component 11 further includes a generally cylindrical recess 46 defined by the base 17 (FIGS. 8 and 9).

The inlet component 11 can be configured to accommodate various shapes of water supply conduits and corresponding attachment points and types. In the preferred embodiments, the inlet component 11 enables the emitter 10 to be detached from the water supply conduit without necessitating removal of any portion of the water supply conduit itself.

In one embodiment, as shown in FIGS. 1-4, 9, and 11, the inlet component 11 has an internally threaded portion 47 integrally formed with the outer casing 18 and the base 17. The threaded portion 47 includes a hexagonal outer portion 48 for use with a wrench or other tool to install the emitter 10 with a threaded engagement to an externally threaded water supply conduit attachment point (not shown). Alternatively, shapes other than a hexagon would suffice. In this embodiment, the threaded portion 47 extends away from the recess 46 and the restrictor protrusions 44. The inlet component 11 threads onto the externally threaded water supply conduit until, preferably, the water supply conduit bottoms out in the threaded portion adjacent to the recess 46. Water enters the inlet tube 36 at the inlet end 38 through the generally cross-shaped opening 45. The threaded portion 47 also could include at least one lever arm (not shown) protruding from the inlet component 11 to allow for easy tightening without the use of a tool.

Figure 5:
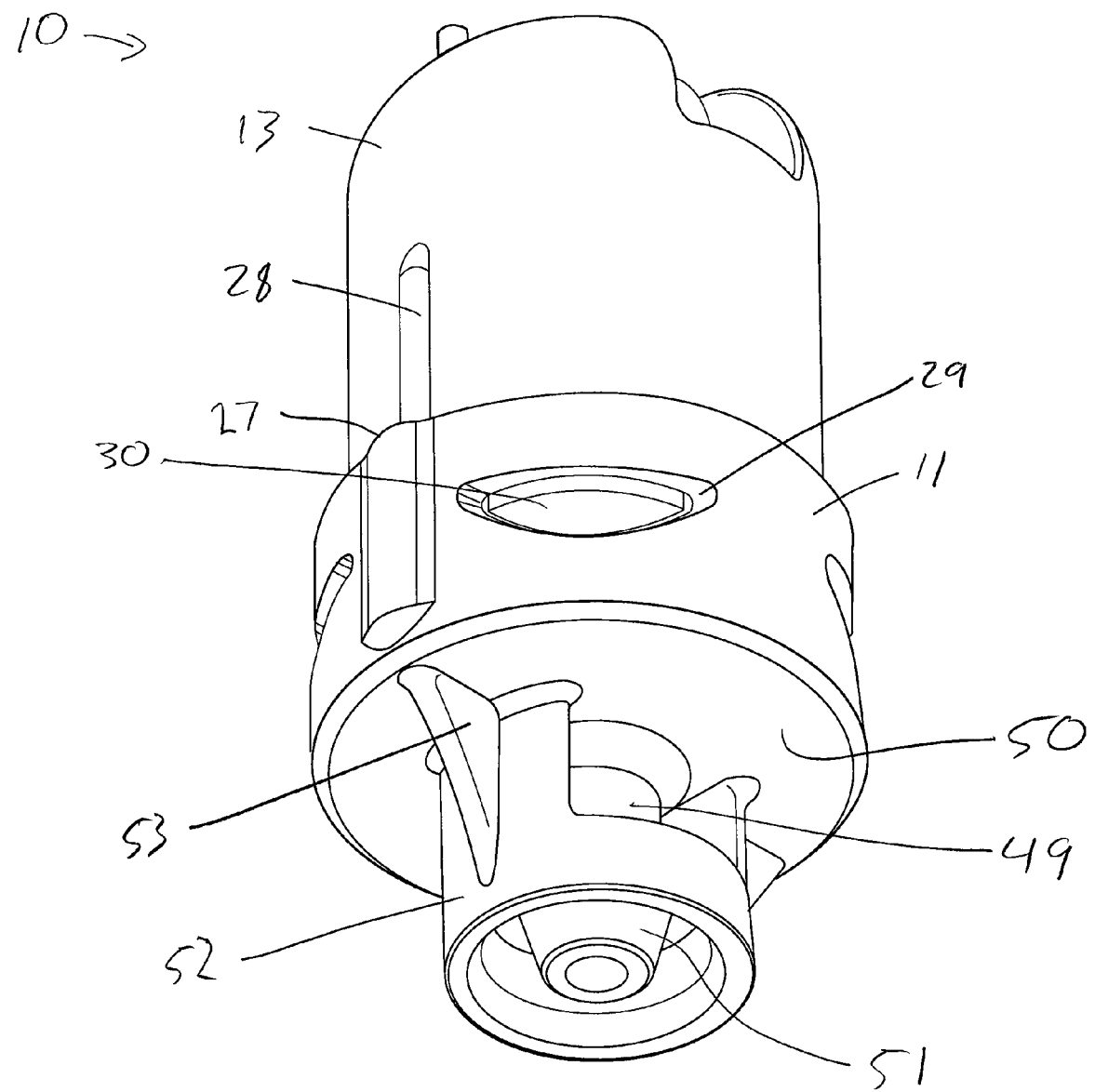
FIG. 5 is a perspective view of an alternative embodiment of a drip emitter embodying features of the present invention.
Figure 6:
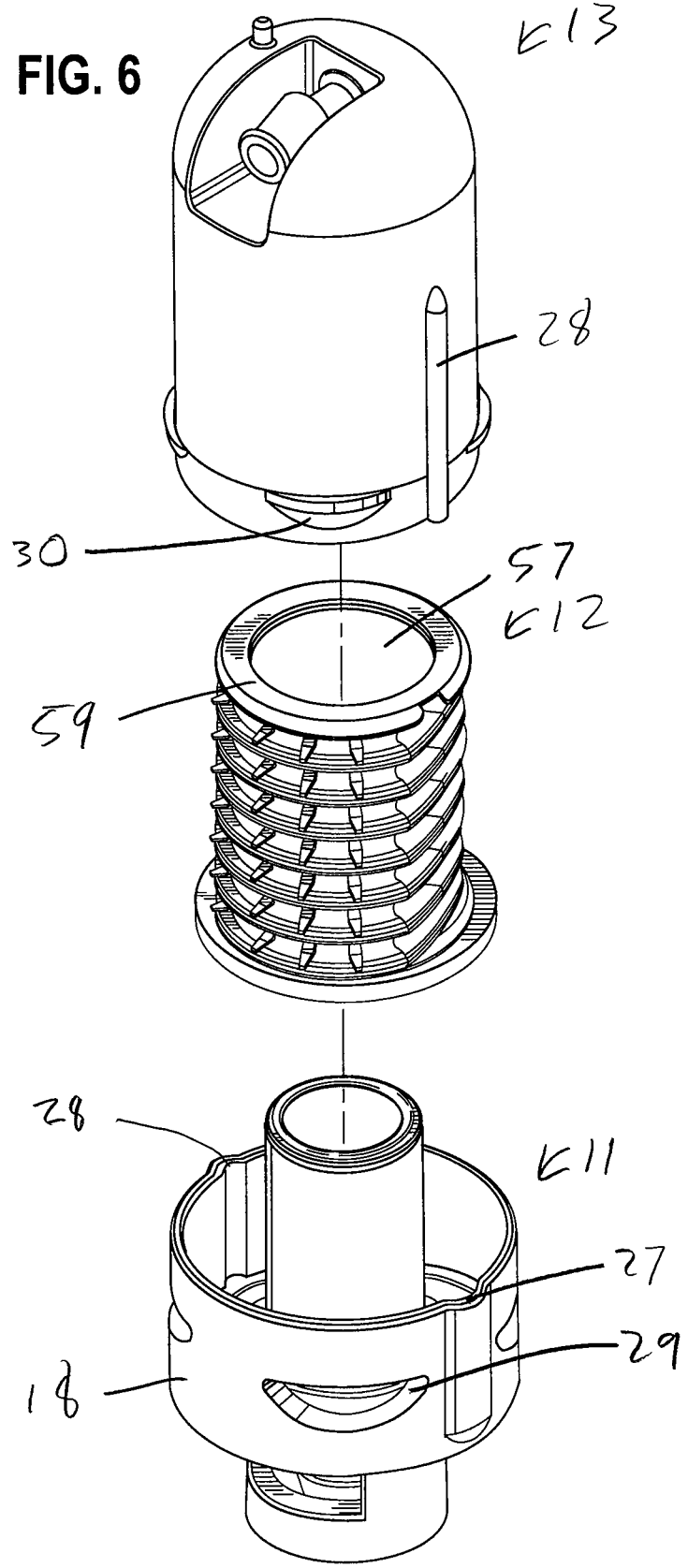
FIG. 6 is an exploded view of the drip emitter of FIG. 5.
Figure 7:
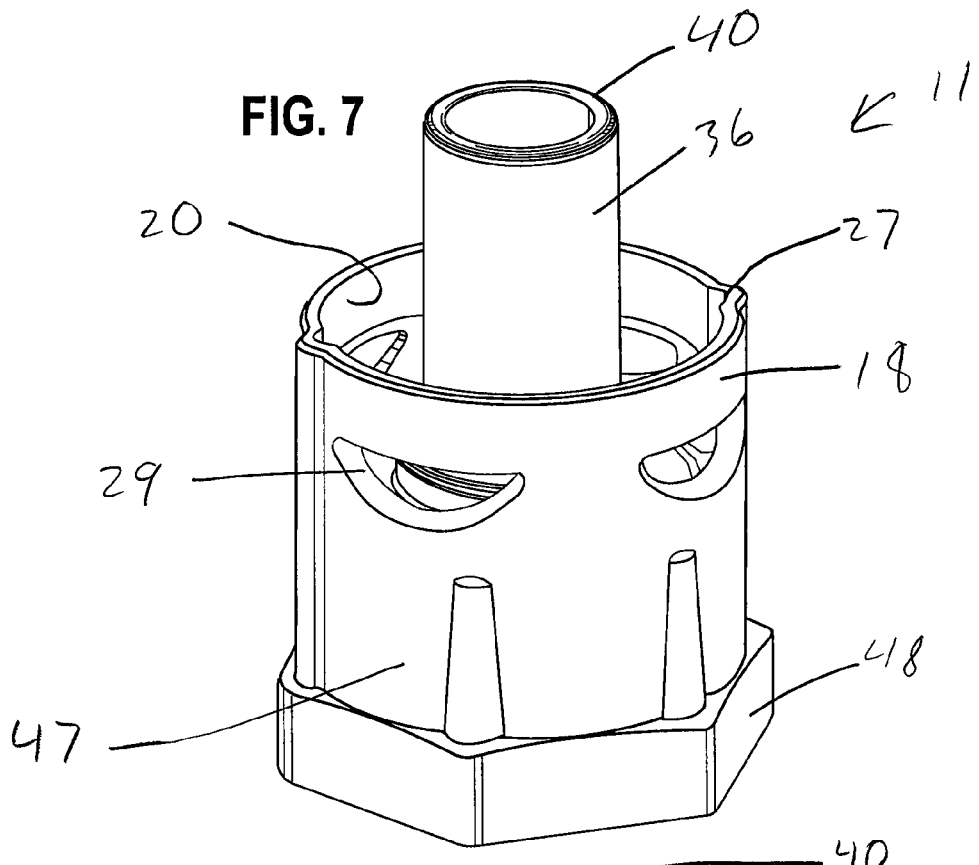
FIG. 7 is a perspective view of an inlet component of the drip emitter of FIG. 1.
Figure 13:
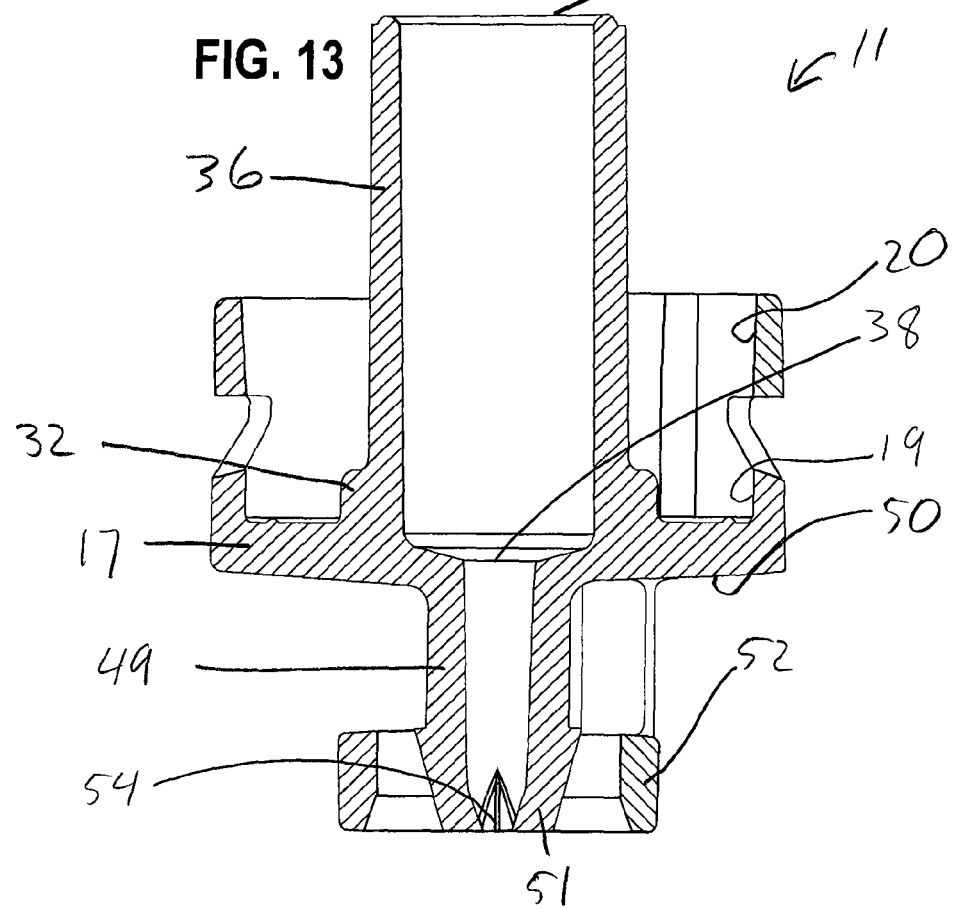
FIG. 13 is a cross-section view of the inlet component of FIG. 12.
Figure 14:
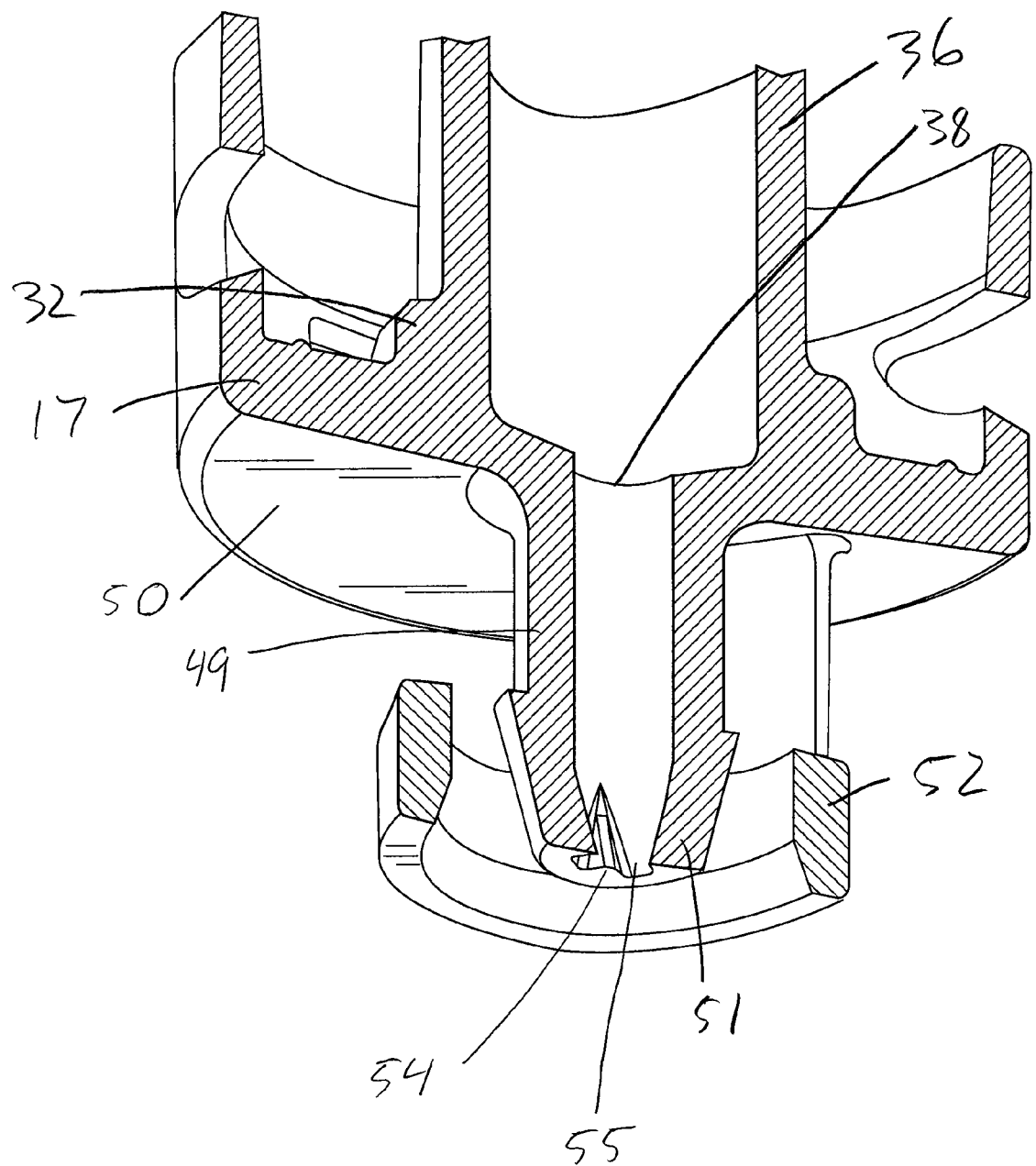
FIG. 14 is a perspective cross-section view of the inlet component of FIG. 12.
Figure 15:
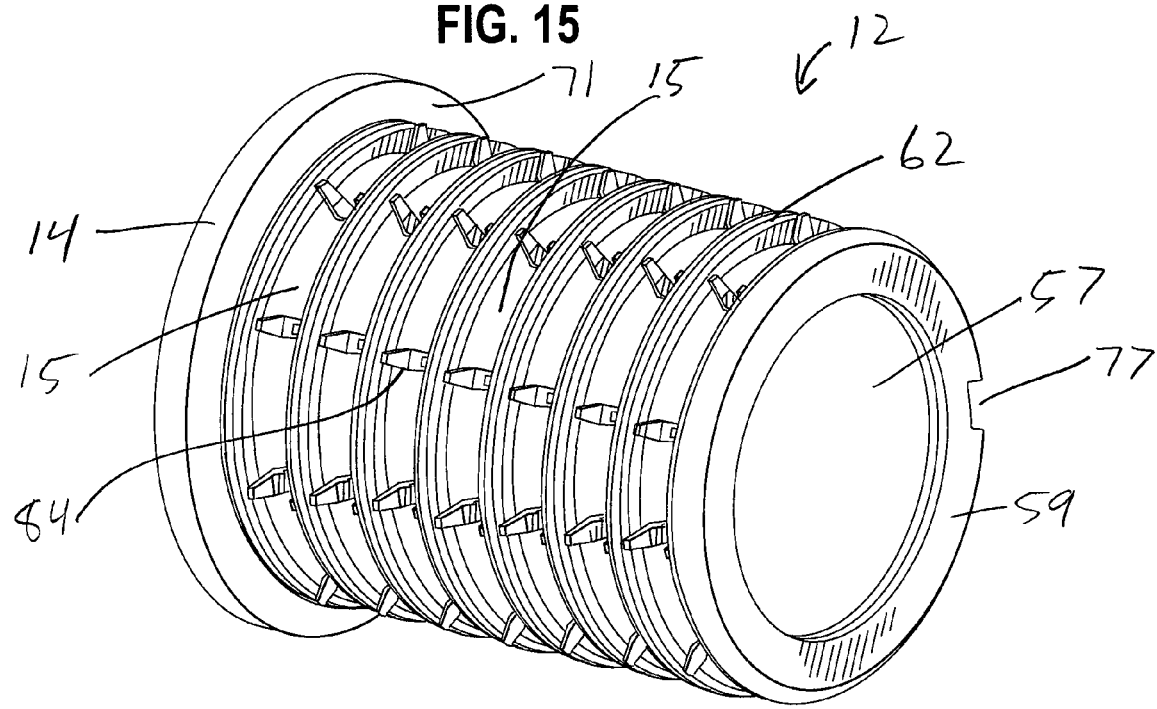
FIG. 15 is a perspective view of a valve component of the drip emitters of FIGS. 1 and 5.
Figure 16:
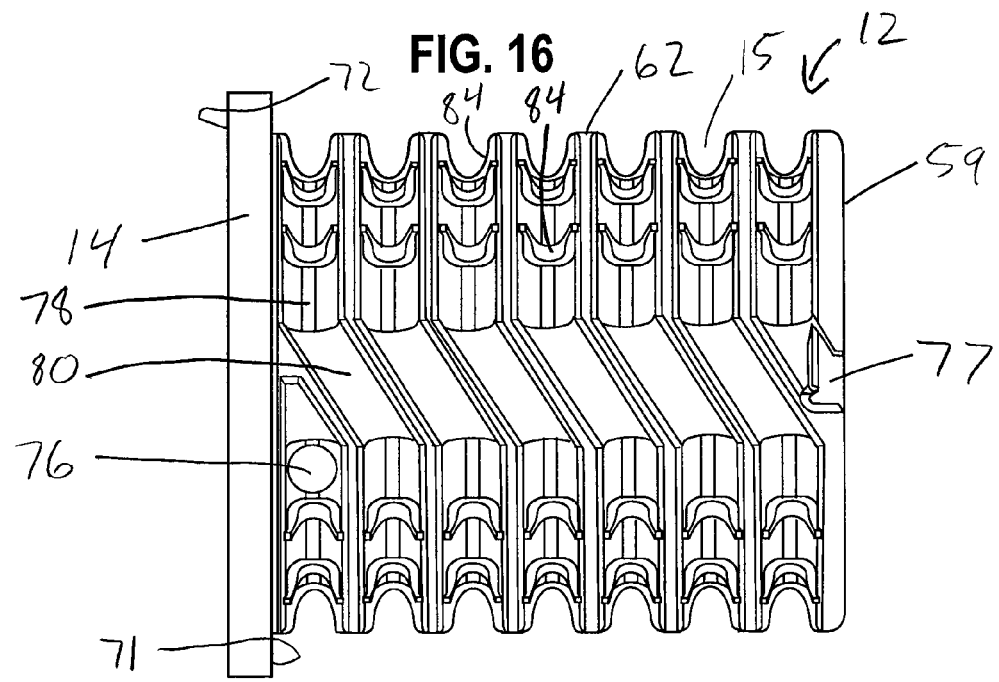
FIG. 16 is a side elevational of the valve component of FIG. 15.

In an alternative embodiment, as shown in FIGS. 5, 6, and 12-14, the inlet component 11 includes a barbed inlet tube 49 that is preferably integral with the base 17. This embodiment includes an external base surface 50 (FIGS. 5, 13, and 14). The barbed inlet tube 49 is coaxial with the inlet tube 36. The barbed inlet tube 49 has a barbed end 51 with a generally tapered shape which facilitates insertion into the water supply conduit.

This embodiment also includes a protective collar 52 that is integrally formed with the base 17. The protective collar 52 is generally cylindrical and extends around the barbed end 51 to protect the barbed inlet tube 49 from damage and the connection from coming disconnected during handling and from side impact loading. The protective collar 52 preferably includes two fins 53 that extend between the protective collar 52 and the external base surface 50 to provide additional lateral support to the protective collar 52.

The barbed end 51 further includes barb restrictor protrusions 54 just inside its inlet. In a preferred form, four barb restrictor protrusions 54 are used to form a generally cross-shaped barb opening 55, which is similar to the cross-shaped opening 45 described above for the other embodiment. This embodiment, however, does not include the restrictor protrusions 44 at the inlet end 38 of the inlet tube 36 (FIGS. 13 and 14), nor does it include the recess 46 because of the integral nature of the barbed inlet tube 49 and the base 17.

Figure 3:
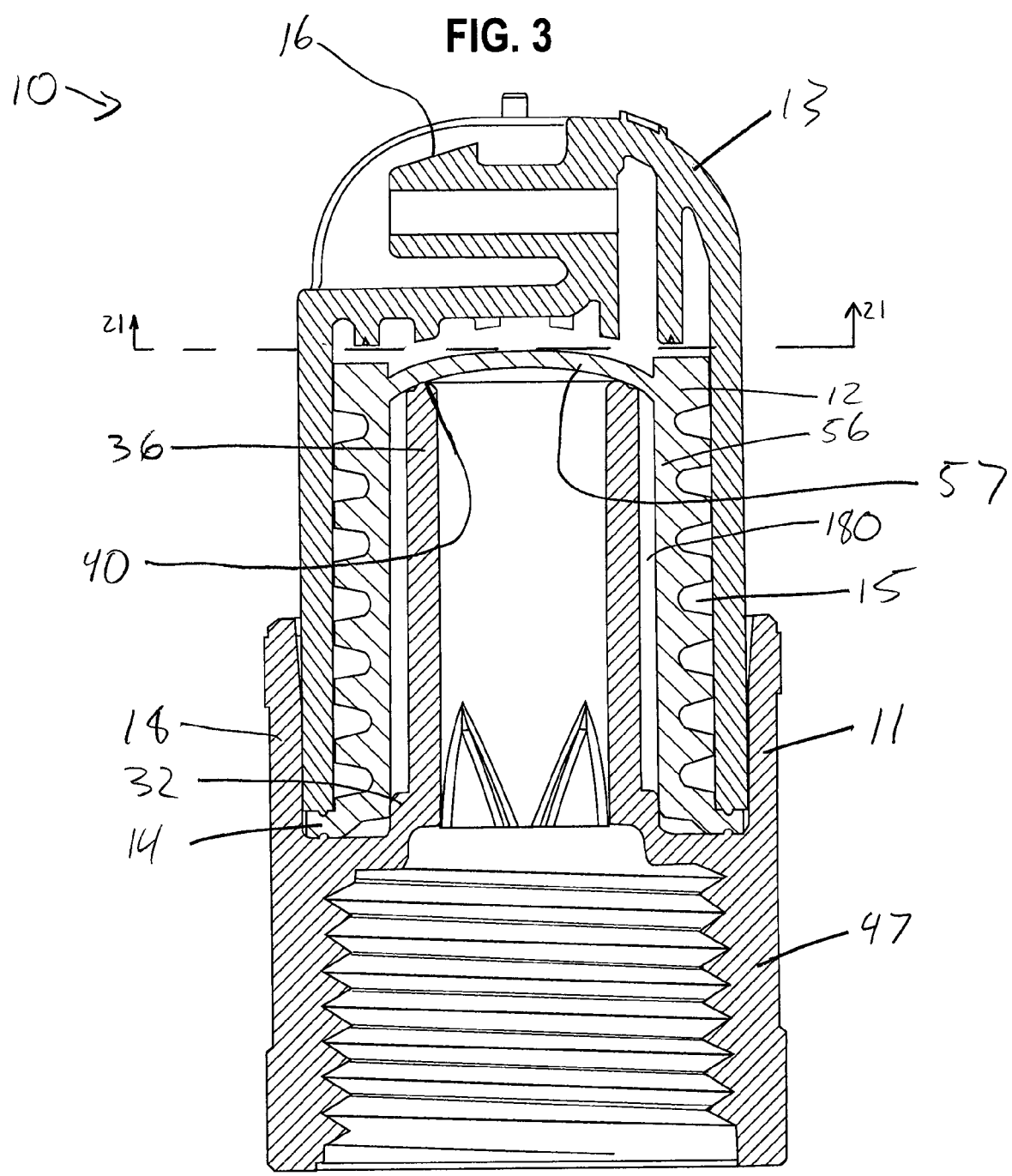
FIG. 3 is a cross-section view of drip emitter of FIG. 1.
Figure 4:
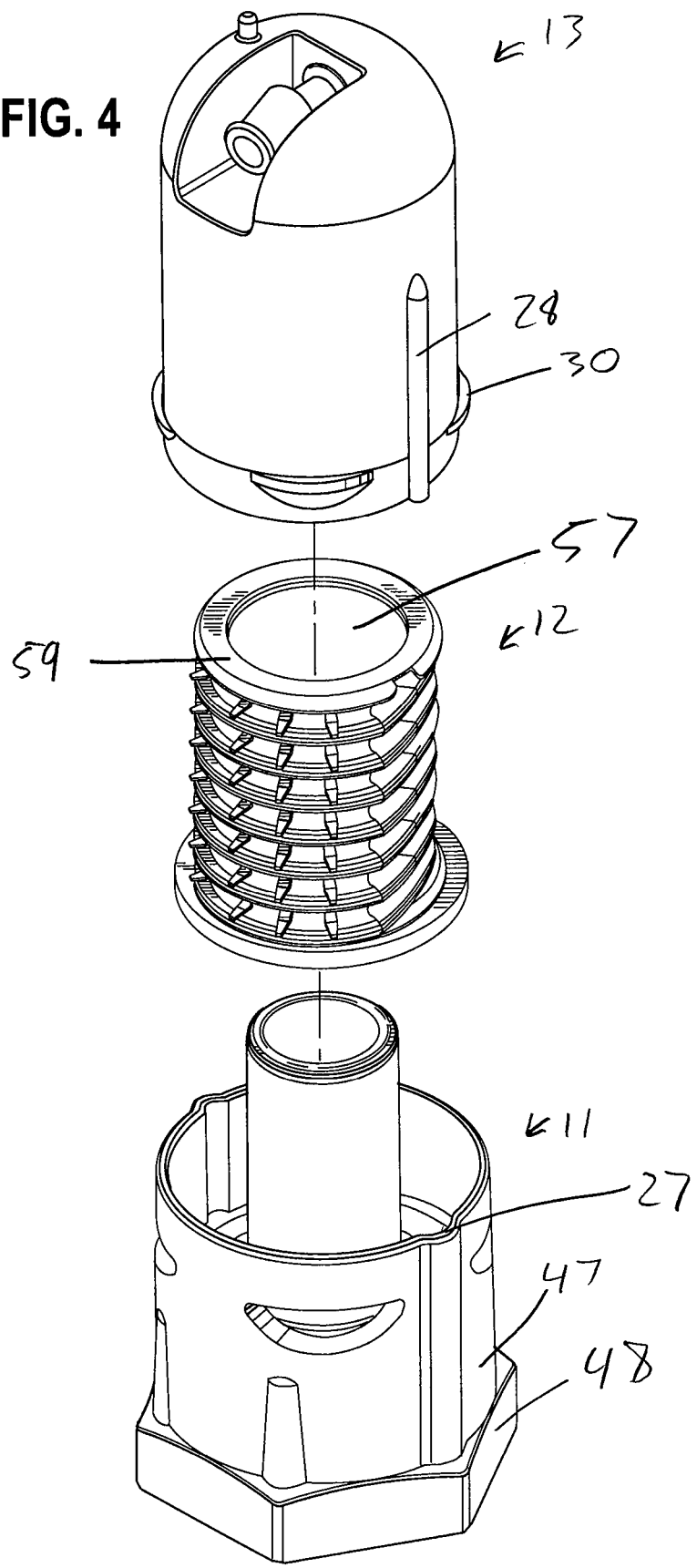
FIG. 4 is an exploded view of the drip emitter of FIG. 1.

With reference to FIGS. 15-18, the valve component 12 includes a cylindrically shaped sidewall 56 and an end wall 57 that operates as a check valve 58, as shown in FIGS. 24-26, with the outlet end 40 of the inlet tube 36. The valve component 12 is made of a flexible and resilient material, preferably silicon, capable of expanding and contracting. The sidewall 56 includes an annular filtering flange 59 surrounding the end wall 57. The end wall 57 includes an inner surface 60 and an outer surface 61. The end wall 57 is generally concave shaped into the valve component 12 in its natural state. The end wall 57 intersects the sidewall 56 radially and longitudinally inward of the filtering flange 59. The distance between the inner surface 60 and the opposite end of the valve component 12 is less than the length of inlet tube 36. Thus, when the valve component 12 is assembled within the inlet component 11 and the outlet component 13, the valve component 12 stretches longitudinally and the end wall 57 engages the outlet end 40 of the inlet tube 36, as shown in FIGS. 3 and 24. This engagement places the check valve 58 in the closed position due the natural resiliency of the end wall 57 of the valve component 12.

Figure 17:
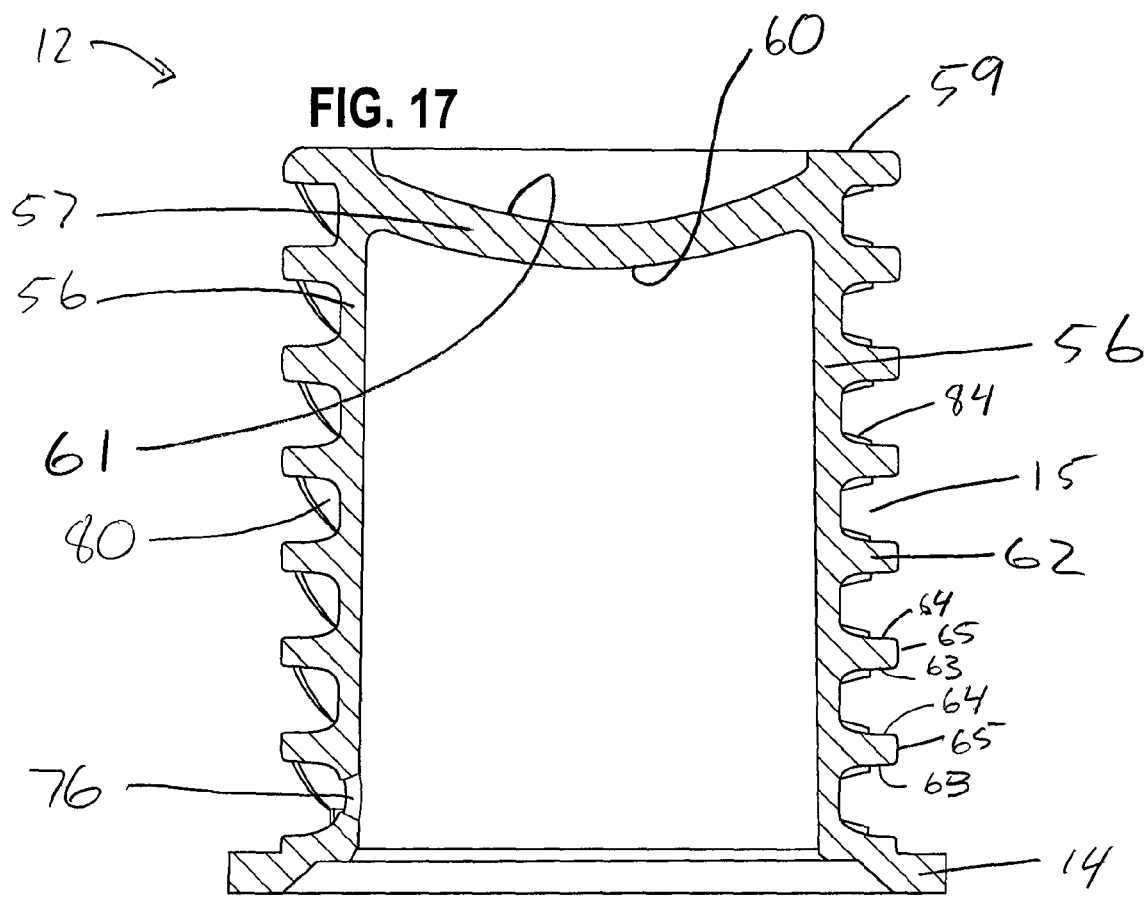
FIG. 17 is a cross-section view of the valve component of FIG. 15.
Figure 18:
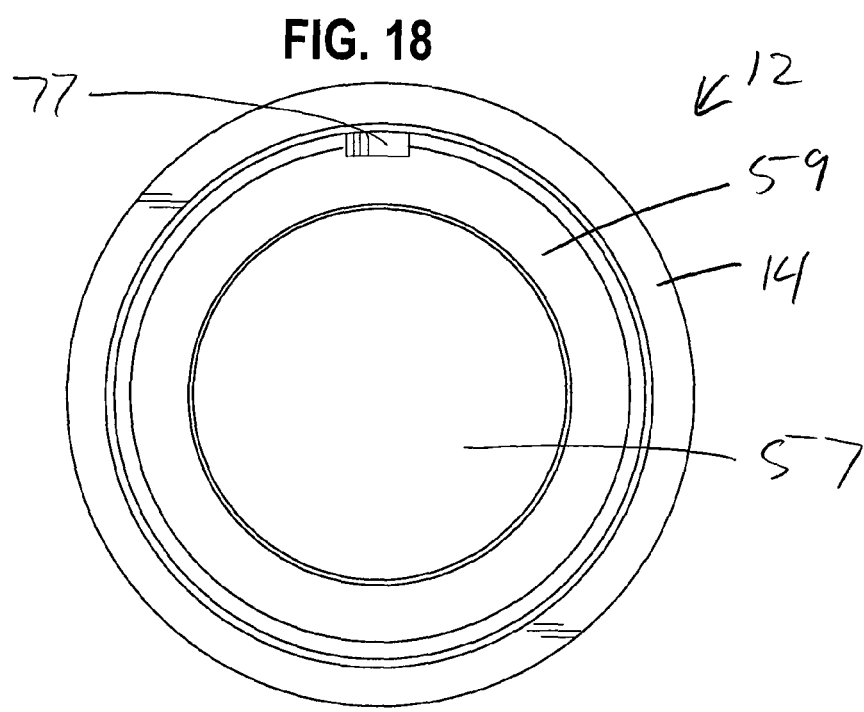
FIG. 18 is a top view of the valve component of FIG. 15.

The valve component 12 further includes at least one labyrinth wall 62 that, when assembled within the outlet component 13, defines the labyrinth flow channel 15. The labyrinth wall 62 is a continuous wall that projects radially from the sidewall 56. As shown in FIG. 17, the labyrinth wall 62 preferably is defined by three surfaces: a first sidewall surface 63; a second sidewall surface 64; and a top wall surface 65 intermediate the first and second sidewall surfaces 63 and 64. When assembled, the valve component 12 combines with the outlet component 13 to form the flow channel 15. Specifically, the flow channel 15 is defined by the open area created between the side wall 56, an inner cylindrical surface 68 of the outlet component 13, the first sidewall surface 63, and the second sidewall surface 64. The top wall surface 65 generally abuts the inner cylindrical surface 68. The labyrinth wall 62 is preferably integral with the side wall 56 and, therefore, is preferably made of the same flexible and resilient material as the valve component 12. Thus, the labyrinth wall 62 is capable of deforming under pressure and returning to its original shape when the pressure subsides.

The valve component further comprises the flange 14 having both an inner sealing surface 71 and an outer sealing surface 72. When assembled, the inner sealing surface 71 engages an outlet component sealing surface 73, further disclosed below, and the outer sealing surface 72 engages the inlet component base 17, as shown in FIGS. 3 and 30. The outer diameter of the flange 14 is preferably sized such that it can fit within the outer casing 18 of the inlet component 11 when assembled, while also being large enough to at least partially overlap with the outlet component sealing surface 73. Given the flexible nature of the material of the preferred valve component 12, the outer diameter of the flange 14 may be slightly larger than the inner diameter of the outer casing 18 while still allowing for the valve component 12 to be inserted within the outer casing 18. The flange 14 is clamped between the sealing surface 73 of the outlet component 13 and the inlet component base 17. The flange 14 creates a seal between the sealing surface 73 of the outlet component 13 and the inlet component base 17.

The valve component 12 defines at least one inlet port 76 to the flow channel 15. The inlet port 76 is generally disposed near the flange 14 of the valve component 12. Water enters the flow channel 15 from the interior of the valve component 12. The valve component 12 further includes at least one outlet port 77 disposed at the filtering flange 59. In a preferred embodiment, the labyrinth flow channel 15 includes annular flow segments 78 connected in series by stepped segments 80. In such an embodiment, water enters the first annular flow segment 78 through the inlet port 76 and travels around it until it reaches the first stepped segment 80, through which the water travels to the next annular flow segment 78. This process is repeated through the remaining annular flow segments 78 and stepped segments 80 until the flow reaches the outlet port 77. In an alternative embodiment, the valve component 12 may include multiple labyrinth walls 62 forming multiple flow channels 15. In such an embodiment, the valve component 12 would include multiple inlet ports 76 and outlet ports 77 allowing for flow through the multiple flow channels 15 defined by the additional labyrinth walls 62. The labyrinth flow channel 15 is not limited to the above described shape. In an alternative embodiment, the flow channel 15 could have a generally helical-shaped path. In further alternative embodiments, the flow channel 15 could have any other tortuous shaped path.

Further, the valve component 12 preferably includes a plurality of generally horseshoe shaped ribs 84 disposed within the flow channel 15 that extend between the sidewalls 63 and 64 of the labyrinth wall 62 of the valve component 12. The ribs 84 are preferably disposed along the flow channel 15 such that the water flowing through the channel 15 passes through the ribs as it travels from the inlet port 76 to the outlet port 77 of the valve component 12. The ribs 84 reduce the cross-section of the flow channel 15 to create a pressure drop in the fluid.

With reference to FIGS. 19-23, the outlet component 13 has a generally cylindrical shaped outer wall 86 having the inner cylindrical surface 68, an open end 88, and a generally domed end 90 opposite the open end 88. The sealing surface 73 defines the open end 88 and is a generally planar annular surface that extends generally radial to the central axis of the outlet component 12. In an alternative embodiment, the outlet component 13 could have a generally polygonal shaped cross-section. The domed end 90 includes an internal domed surface 91. The domed end 90 defines a generally rectangular recess 92 that accommodates the emitter outlet 16. The emitter outlet is in fluid communication with the interior of the outlet component 13. The outlet component 13 is preferably made from a sturdy and non-corrosive material.

Figure 21:
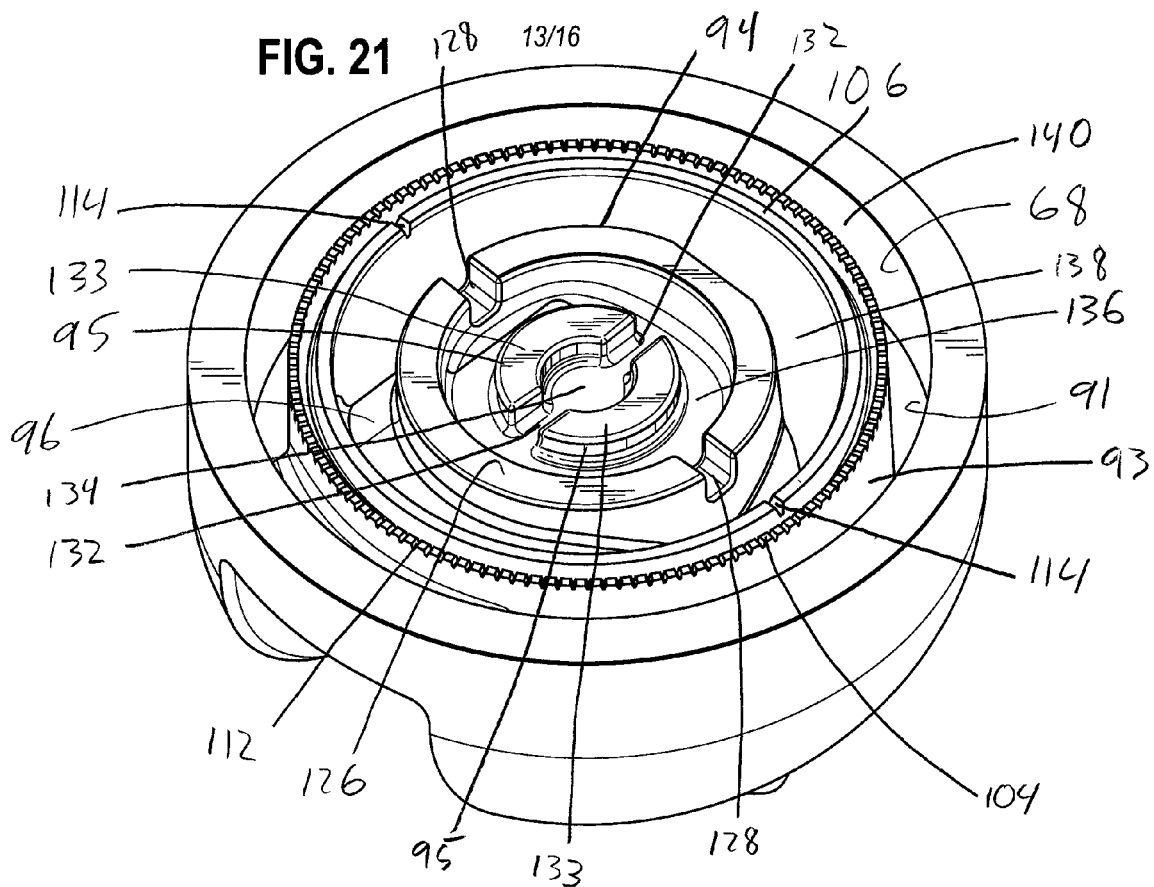
FIG. 21 is a perspective cross-section view of a partial cutout of the outlet component of FIG. 19 taken along line 21-21 of FIG. 3.

Within the domed end 90 of the outlet component 13 there are three concentric cylindrical rings: an outer ring 93; an intermediate ring 94; and a central ring 95, as shown in FIGS. 21 and 23. The rings are preferably coaxial with the central axis of the outlet component 13. As shown in FIGS. 24-26, the cylindrical ends of the rings 93, 94, and 95 are staggered to accommodate the annular filtering flange 59 and the generally bulbous shape of the valve end wall 57 when the valve component 13 extends longitudinally during pressurized operation. The rings 93, 94, and 95 are preferably integrally formed with the outlet component 13.

The recess 92 defines an internal shelf surface 96, as shown in FIGS. 20, 21, and 23. The shelf surface 96 is generally planar and perpendicular to the central axis of the outlet component 13. The recess 92 further defines internal surfaces 97 and 98 that are generally parallel to each other that extend longitudinally between the internal shelf surface 96 and the internal domed surface 91.

As shown in FIGS. 20, 21, and 23, the outer ring 93 extends, partially, from the internal domed surface 91 of the domed end 90 in a longitudinal direction coaxial with the central axis of the outlet component 13. The remaining part of the outer ring 93 extends from the internal shelf surface 96. The outer ring 93 also intersects and integrates with the internal surfaces 97 and 98. The outer ring 93 has a generally cylindrical shape and is generally coaxial with the central axis of the outlet component 13. The outer ring 93 includes a filtering portion 104 located radially outward of a metering portion 106. The portions 104 and 106 are generally concentric and are separated by an annular groove 108 having a generally v-shaped cross-section. The portions 104 and 106 are aligned with the annular filtering flange 59 when the valve component 12 expands during pressurized operation, as shown in FIG. 26.

The filtering portion 104 includes a plurality of filtering grooves 112, and the metering portion 106 includes at least one metering groove 114. The filtering grooves 112 each have a smaller cross-section than the at least one metering groove 114. Thus, any debris that passes through the filtering grooves 112 will be able to pass through the at least one metering groove 114. In a preferred embodiment, there are 120 filtering grooves equally spaced around the filtering portion 104; however, other quantities and spacing would also suffice.

The filtering grooves 112 have a generally trapezoidal radial cross-section, as shown in FIG. 27. The at least one metering groove 114 also has a generally trapezoidal radial cross-section, as shown in FIG. 29. In one embodiment, the metering portion 106 includes a single metering groove 114. In an alternative embodiment, the metering portion 106 includes two metering grooves 114 preferably located on diametrical sides of the metering portion 106, as shown in FIGS. 21 and 23. When two metering grooves 114 are used, the flow rate is generally doubled relative to the flow rate of a single metering groove 114. Three metering grooves 114 would generally result in a flow rate that is three times as high as the single metering groove embodiment. Thus, the metering ring 110 is capable of having a plurality of metering grooves 114 in order to achieve the desired flow rate.

More specifically, the general trapezoidal shape of each metering groove 114 is defined by a metering depth D1, bottom width BW1, a top width TW1, and a resulting metering angle of A1, as shown in FIG. 29. By way of example, the preferred measurement of D1 is about 0.014+/−0.001 inches, the preferred measurement of BW1 is about 0.0025+/−0.0005 inches, and the preferred measurement of TW1 is about 0.013+/−0.001 inches. This results in an approximate metering angle A1 of about 40 degrees. Thus, the preferred overall cross-sectional area of each metering groove 114 is about 106.3 square mils (mil=0.001 inches).

The general trapezoidal shape of each filtering groove 112 is defined by a filtering depth D2, a bottom filtering width BW2, a top filtering width TW2, and a resulting filtering angle A2, as shown in FIG. 27. By way of example, the preferred measurement of D2 is about 0.004+/−0.001 inches, the preferred measurement of BW2 is about 0.0025+/−0.0005 inches, and the preferred measurement of TW2 is about 0.005+/−0.001 inches. This results in an approximate filtering angle A2 of about 40 degrees. Thus, the preferred overall cross-sectional area of each filtering groove 112 is about 15.8 square mils.

The above measurements operate to limit grit intrusion through the grooves 112 and 114 while also facilitating grit removal for grit that becomes trapped in the grooves 112 and 114 during operation. The preferred measurements are not intended to be limiting but only examples. Other combinations of dimensions would also suffice. For example, if one metering groove 114 is used, there is a total cross-section area ratio of the filtering grooves 112 to the metering groove 114 of approximately 17.8. If two metering grooves are used, the ratio is approximately 8.9. The smaller area of a single filtering groove 112 operates to limit the intrusion of foreign debris into the larger metering groove 114.

During pressurized operation the annular filtering flange 59 will expand longitudinally and engage the outer ring 93, which allows the filtering grooves 112 to limit grit intrusion and metering grooves 114 to limit the amount of water that passes through the outer ring 93. During periods of low pressure, or when the pressure is shut off, the annular filtering flange 59 is disengaged from the outer ring 93, and the filtering grooves 112 and metering grooves 114 are disengaged from the annular filtering flange 59 allowing grit or debris that had become lodged around the outer sealing ring to become dislodged.

Figure 22:
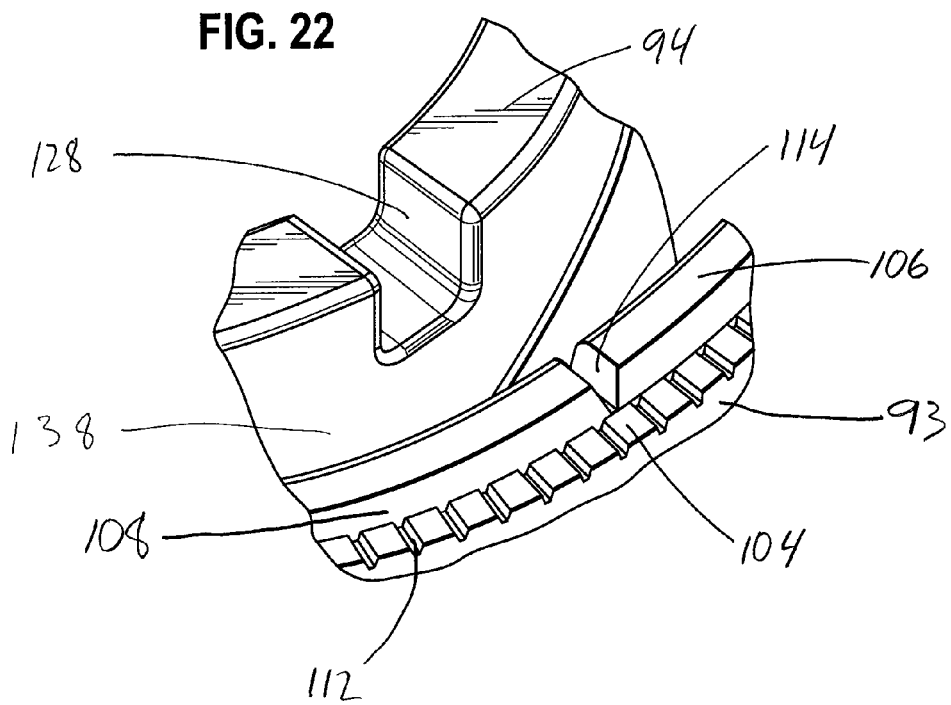
FIG. 22 is an enlarged view of a portion of FIG. 21.

As shown in FIGS. 20-23, the intermediate ring 94 is located radially inward of the outer ring 93. The intermediate ring 94 extends generally perpendicularly from the internal shelf surface 96 and includes an axially facing surface 126. A portion of the intermediate ring 94 is integral with an internal surface 127 defined by the recess 92, as shown in FIGS. 20 and 23. The intermediate ring 94 extends toward the open end 88 longitudinally less than the outer ring 93, as shown in FIG. 20. The surface 126 tapers generally inward, as shown in FIG. 20, to accommodate the generally bulbous shape of the valve end wall 57 that occurs during pressurized operation, as shown in FIG. 26. The shorter extension and tapering combine to allow the valve component 12 to expand and abut both the outer ring 93 and the intermediate ring 94 simultaneously. The intermediate ring 94 includes at least one radially extending generally rectangular vent 128, as shown in FIGS. 21 and 22. In a preferred embodiment, the intermediate ring 94 contains two vents 128 that are diametrically opposite one another on the intermediate ring 94. As illustrated, the vents 128 can be radially in line with the metering grooves 114. In an alternative embodiment, the vent or vents 128 can be located at other points about the intermediate ring 94 and operate effectively. During pressurized operation, the end wall 57 can abut the intermediate ring 94 when the valve component 12 extends axially. The vents 128 allow any water that has accumulated within the intermediate ring 94 to pass radially outward through the vents 128.

As shown in FIGS. 20, 21, and 23, the central ring 95 is located radially inward of the intermediate ring 94 and includes at least one radially extending, generally rectangular vent 132. In a preferred embodiment, the central ring 95 includes two vents 132 that are diametrically opposite one another on the central ring 95. In addition, the vents 132 can be staggered rotationally about the central ring 95 generally 90 degrees from the intermediate ring vents 128, as shown in FIGS. 21 and 23. However, the vent or vents 132 can be located at other positions on the central ring 95 and relative to the vents 128 of the intermediate ring 94. The central ring 95 extends generally perpendicularly from the internal shelf surface 96 and has an axially facing surface 133. The central ring 95 extends longitudinally less than the intermediate ring 94, as shown in FIG. 20. Additionally, the surface 133 is preferably tapered inward to accommodate the generally bulbous shape of the valve end wall 57 that occurs during pressurized operation. The shorter extension and tapering combine to allow the valve component 12 to expand and abut the outer ring 93, the intermediate ring 94, and the central ring 95 simultaneously during pressurized operation.

The concentric rings 93, 94, and 95, the internal shelf surface 96, the internal domed surface 91, the inner cylindrical surface 68, and the internal surfaces 97 and 98 combine to form multiple cavities, as shown in FIGS. 20-23. A central cavity 134 is formed within the central ring 95. An annular intermediate cavity 136 is formed between the central ring 95 and the intermediate ring 94. An outlet cavity 138 is formed between the intermediate ring 94, the outer ring 93, and the internal surfaces 97 and 98. The rectangular vents 128 and 132 allow for water, grit, or debris within the cavities 134 and 136 to travel through the vents 128 and 132 and further through the outlet cavity 138 and out of the emitter 10 through the emitter outlet 16. An arcuate metering chamber 140 is created in the cavity between the outer ring 93, the internal domed surface 91, the inner cylindrical surface 68, the internal shelf surface 96, and the internal surfaces 97 and 98. During pressurized operation, water exiting the flow channel 15 accumulates in the metering chamber 140 before passing through the filtering grooves 112 and the metering grooves 114.

The outlet cavity 138 is in fluid communication with the emitter outlet 16. Water that has passed through the metering grooves 114 travels into the outlet cavity 138 and through the emitter outlet 16. The emitter outlet 16 extends generally perpendicular to the central axis of the outlet component 13 from a longitudinally extending external surface 142 defining in part by the recess 92, as shown in FIGS. 19 and 20. The emitter outlet 16 is generally cylindrical in shape and preferably includes a barbed end 144, though other end shapes would also be sufficient to securely attach a conduit. The emitter outlet 16 is sized such that it is sub-flush from a hemispherical outer surface 146 of the outlet component 13, as shown in FIGS. 19 and 20. This size and position of the emitter outlet 16 protect it from damage in the field or from disconnection of a conduit in the event that the emitter 10 receives an external impact such as being stepped on or dropped. In such cases, the emitter outlet 16 will generally be shielded from any damaging contact.

The outlet component 13 includes a plurality of the coupling tabs 30 protruding from an outer surface 148 of the outlet component wall 86. The coupling tabs 30 operate to join the outlet component 13 to the inlet component 11. The coupling tabs 30 are sized so as to fit into the coupling openings 29 of the inlet component 11. The tabs 30 are shaped such that they include a coupling tab surface 150 that is generally flat and generally perpendicular to the central axis of the outlet component 13. When the outlet component 13 and the valve component 12 are assembled with the inlet component 11, the coupling tab surfaces 150 engage coupling surfaces 152 of the coupling openings 29 (FIG. 30).

Figure 2:
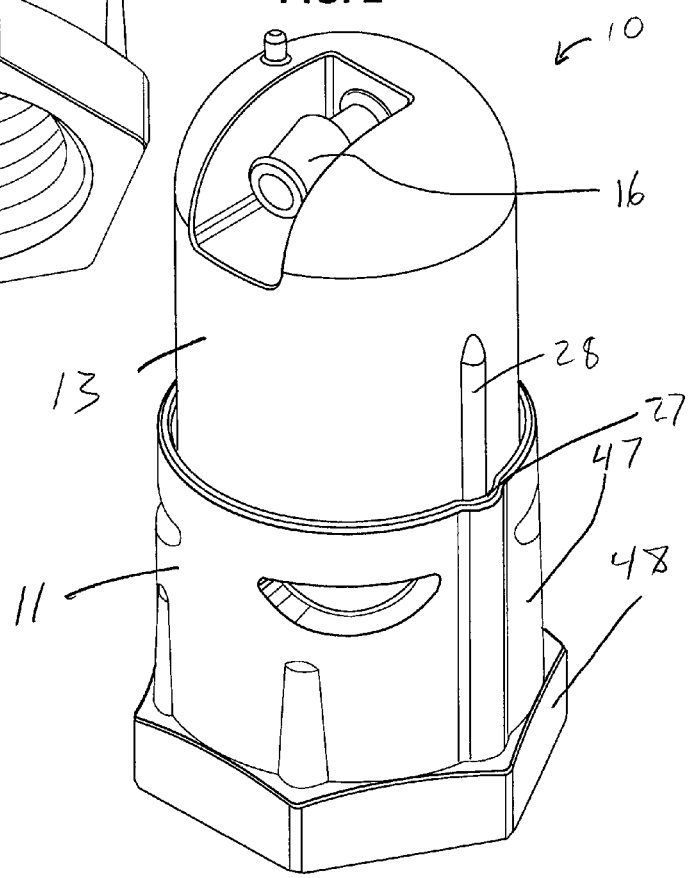
FIG. 2 is another perspective view of the drip emitter of FIG. 1.

With reference to FIG. 30, when assembled, the valve component flange 14 is compressed between the outlet component sealing surface 73 and an inlet component sealing surface 154. The outlet component sealing surface 73 includes an outlet sealing bead 156 protruding annularly around the outlet component sealing surface 73. In a preferred embodiment, the inlet component sealing surface 154 includes an annular inlet sealing bead 158 that protrudes from the inlet component base 17. The inlet sealing bead 158 is located radially between the outer casing 18 and the valve locating step 32. The valve component flange 14 receives maximum compression between the sealing beads 156 and 158 thereby improving the seal between and the gripping by the inlet component 11 and the outlet component 13. Additionally, the outlet component 13 preferably includes the alignment ribs 28 which protrude radially from the outer surface 148 of the outlet component wall 86, as shown in FIG. 19. In a preferred embodiment, two alignment ribs 28 are used. The alignment ribs 28 run generally parallel to the central axis of the outlet component 13. When assembled, the alignment ribs 28 are received within the alignment slots 27 in the inlet component 11 to ensure alignment of the coupling tabs 30 and coupling openings 29 and proper assembly of the three components, as shown in FIGS. 1, 2, and 5. In an alternative embodiment, the outlet component 13 can have a single alignment rib 28 or any other number of ribs 28. Alternatively, the outlet component 13 could contain zero alignment ribs 28 and still function properly because of the engagement between the coupling tabs 30 and coupling openings 29.

More specifically, the emitter 10 is assembled by inserting the valve component 12 into the outlet component 13 and subsequently inserting them within the outer casing 18 of the inlet component 11, as shown in FIGS. 1-6. In a preferred embodiment, the alignment ribs 28 slide into the alignment slots 27 to facilitate assembly. In alternative embodiments where only one alignment rib 28 is used, the single alignment rib 28 slides into a single alignment slot 27. If there are no alignment ribs 28, the coupling tabs 30 and corresponding coupling openings 29 ensure proper assembly. Alternatively, the valve component 12 can be inserted within the outer casing 18 of the inlet component 11. Thereafter, the outlet component 13 can be inserted over the valve component 12, as described above, within the inlet component outer casing 18. In either assembly, the valve component 12 is properly located by fitting around the locating step 32 of the inlet component 11, as shown in FIGS. 3 and 30. When assembled, the valve component flange 14 is compressed between the outlet 20 and the inlet 16 components, thereby creating an annular seal between the outlet component sealing surface 73, the valve component flange 14, and the inlet component sealing surface 154, as shown in FIG. 30. This also grips the flange 14 sufficiently so that the valve component 12 does not pull free when it is extended during pressurized operation.

Because the height of the valve component 12 in its natural state is less than the height of the inlet tube 36, when assembled, the valve component 12 extends axially where the valve end wall 57 contacts the inlet tube 36, as shown in FIGS. 3 and 24. The resilient nature of the valve component 12 creates the check valve 58. A valve chamber 180 is created in the area between the valve component 12 and the inlet tube 36 as shown in FIGS. 3 and 24-26. The valve chamber 180 is a generally annular chamber that allows for water that has passed through the inlet tube 36 to flow to and through the inlet port 76 and into the flow channel 15 when the water pressure is high enough and the check valve 58 is open. Water is restricted from entering the valve chamber 180 when the check valve 58 is closed during periods of low pressure or when water pressure is shut off.

The emitter 10 is installed on the water supply conduit by threaded or barbed engagement, depending on the particular embodiment. As shown in FIG. 24, at low water pressure, e.g., generally less than about 3.5 psi, or when the water is turned off, the check valve 58 remains closed and water does not flow through the emitter 10, but is stopped at the check valve 58. In the closed position, the check valve 58 engages the outlet end 40 of the inlet tube 36. As shown in FIG. 26, when the water pressure increases beyond a predetermined threshold level, e.g., generally about 3.5 psi, the water will push open the check valve 58 and water will flow into the valve chamber 180. After water flows into the valve chamber 180, it will enter the flow channel 15 through the inlet port 76 shown in FIGS. 16 and 17. The water will then flow around the first annular flow segment 78 and through the first stepped segment 80 toward the outlet port 77. This continues through the subsequent annular flow segments 78 and the subsequent stepped segments 80. As the water flows through the flow channel 15 from the inlet port 76 to the outlet port 77, the water experiences a pressure drop.

As the water flows through the annular flow segments 78, it passes around and over the horseshoe shaped ribs 84 which form restrictive orifices. As the water passes through these orifices it experiences a pressure drop due to the smaller cross-sectional area of the flow channel 15 at each rib 84. While the check valve 58 is in the open position allowing water flow through the emitter 10, and when the water pressure is above a predetermined threshold level, e.g., generally about 15 psi, the annular filtering flange 59 engages the outer ring 93 as shown in FIG. 26. Water exits the flow channel 15 through the outlet port 77 shown in FIGS. 15, 16, and 18. The outlet port 77 is located radially outward of the outer ring 93, so the water exiting the flow channel 15 through the outlet port 77 accumulates in the metering chamber 140. Water from the metering chamber 140 flows through the filtering grooves 112 of the outer ring 93 and into the annular groove 108 shown in FIG. 22. The water then travels from the annular groove 108 through the metering groove or grooves 114. As shown in FIGS. 21 and 26, water passing through the metering groove or grooves 114 will accumulate in the outlet cavity 138, the intermediate cavity 136, and the central cavity 134. The water has entered these cavities at the predetermined metered rate. Because the water is flowing into these cavities from the metering groove or grooves 114, the water is forced toward the emitter outlet 16 through the outlet cavity 138 and out of the emitter 10 through the emitter outlet 16. The vents 128 and 132 allow for the cavities 134, 136, and 138 to remain in fluid communication with one another when the valve component 12 simultaneously abuts the rings 93, 94, and 95. The metered rate can be altered depending on the number of metering grooves 114 that exist in the metering portion 106.

With reference to FIGS. 3 and 17, the valve component 12 is capable of expanding in both the axial and radial direction as pressure increases and returning to its natural condition as pressure decreases during the flow cycle. The valve component 12 is made of a flexible and resilient material in order to expand and return to its natural condition due to changes in water pressure in the water supply conduit. More specifically, when water pressure increases in the valve chamber 180, the sidewall 56 of the valve component 12 expands radially. When the sidewall 56 expands radially, the labyrinth wall 62 that forms the flow channel 15 is compressed against the inner cylindrical surface 68 of the outlet component 13. This compression reduces the cross-sectional area of the flow channel 15. This reduction of cross-sectional area increases the pressure drop caused by the flow channel 15. When the water supply conduit pressure decreases, the valve component 12, including the sidewall 56 and the labyrinth wall 62, retracts from the inner cylindrical surface 68 toward its natural condition, thereby increasing the cross-sectional area of the flow channel 15 and reducing the amount of pressure drop. This regulation provided by the valve component 12 allows the emitter 10 to achieve a relatively constant outlet pressure regardless of the fluctuations of the pressure in the water supply conduit.

During operation, it is not uncommon for grit or debris to enter the water supply conduit and subsequently enter the emitter 10. The restrictor protrusions 44 or barb restrictor protrusions 54 generally prevent large pieces of debris from entering the emitter 10. The debris will generally travel along with the water through the emitter 10. As debris exits the flow channel 15, it will accumulate in the metering chamber 140 and around the outer ring 93 at the filtering grooves 112. When the annular filtering flange is engaged with the outer ring 93, the filtering grooves 112 will prevent grit that is larger than the cross-sectional area of an individual filtering groove 112 from passing through. Because the total combined cross-sectional area of the filtering grooves 112 is significantly larger, e.g., approximately 17.8 times larger, than that of a single metering groove 114, there is minimal risk that the filtering grooves 112 will become too clogged to allow for a sufficient amount of water to pass through the remaining unclogged filtering grooves 112 and subsequently through to the metering groove or grooves 114. Because the cross-sectional area of a single metering groove 114 is larger than the individual filtering grooves 112, any debris that makes it through the filtering grooves 112 will pass through the metering groove or grooves 114, thus preventing clogging of the metering groove or grooves 114 during operation. The balance between the size and number of the filtering grooves 112 and metering grooves 114 enhances protection against clogging.

At the end of a watering cycle, the water pressure is decreased or shut off which stops the water from flowing through the emitter 10 and stops the water in the emitter 10 from exiting though the emitter outlet 16. When the pressure in the water supply conduit drops below a predetermined amount, e.g., approximately 3.5 psi, the valve component 12 contracts and returns to its natural condition and the check valve 58 returns to its naturally biased position against the outlet end 40 of the inlet tube 36, as shown in FIG. 24. This position defines a reservoir 184 intermediate the valve component 12 and the rings 93, 94, and 95 and the cavities 134, 136, 138, and 140, as shown in FIGS. 24 and 25. As a result, the metering groove or grooves 114 and filtering grooves 112 are open to the reservoir 184. The contraction of the valve component 12 draws flow down from the cavities 134, 136, 138, and 140. This tends to wash debris from around the rings 93, 94, and 95 and the cavities 134, 136, 138, and 140.

At the start of the next watering cycle, the emitter 10 will perform a flushing cycle as shown in FIG. 25. The flushing cycle occurs generally when the water pressure is between two predetermined threshold levels, e.g., approximately between 3.5 and 15 psi. As shown in FIG. 25, when this occurs the check valve 58 opens slightly and allows water to flow past the outlet end 40 of the inlet tube 36 and subsequently through the flow channel 15 as described above. However, when the water pressure is within the flushing cycle range, there is insufficient pressure to expand the valve component 12 such that the annular filtering flange 59 engages the outer ring 93. Therefore, the water that has exited the flow channel 15 through the outlet port 77 is not limited to accumulating in the metering chamber 140 or restricted from filling up in the reservoir 184. Thus, the debris that has accumulated in the reservoir 184 is flushed out through the outlet cavity 138 and emitter outlet 16 by the relatively unrestricted flow. Once the water pressure increases beyond this flushing range, e.g., generally about 15 psi, the check valve 58 is fully open and the annular filtering flange 59 engages the outer ring 93, which concludes the flushing cycle and the emitter 10 begins its metering operation, as shown in FIG. 26. It is possible that not all grit and debris will be removed after one flushing cycle. However, when a new watering cycle begins, the emitter 10 performs the flushing cycle again, so grit left behind after a particular flushing cycle can be removed during subsequent cycles.

In the event that enough grit enters the emitter 10, such as a sudden sand influx or other introduction of a relatively large volume of grit or debris, to clog a significant number of the filtering grooves 112, the flow through the emitter 10 may become restricted. In such a situation, water will accumulate in the metering chamber 140. At the end of this restricted watering cycle, the valve component 12 will contract and the grit and water will tend to be washed and dislodged from the filtering grooves 112 as described above in the flushing cycle. It is possible that a single flushing cycle will not remove enough grit from the filtering grooves 112 to allow for resumed water flow during the next cycle. However, during the next cycle, the emitter 10 and metering chamber 140 will once again fill with water up until it reaches the outer ring 93 and clogged filtering grooves 112 and, at the end of the watering cycle, the grit will once again tend to be washed and dislodged from the filtering grooves 112 into the reservoir 184. This repeated flushing process will eventually remove the grit from the filtering grooves 112 and return the emitter 10 to the optimum operating condition.

During the operation of the irrigation process, a large amount of grit may be introduced into the emitter 10 from the water supply conduit, such as in the case of an accidental break in the water supply conduit. When this occurs, large pieces of grit and debris can become trapped within the flow channel 15, thereby causing the emitter 10 to become clogged. When this occurs, water will not be able to travel completely through the flow channel 15 to enter the metering chamber 140 or flow through the filtering grooves 112. When water enters the emitter 10 and the check valve 58 opens, the water will continue to flow through the emitter 10 as described above until it encounters the blockage in the flow channel 15. The emitter 10 also is capable of self flushing the grit in this clogged condition. The radial expansion of the valve component 12 during pressurized operation, along with the subsequent radial contraction when water pressure is decreased, operates to break up and dislodge the grit from the flow channel 15. Specifically, the sidewall 56 and the labyrinth wall 62 will repeatedly compress against the inner cylindrical surface 68 and return back to their normal condition as the water pressure in the water supply conduit is increased and decreased, respectively. Due to the repeated increase and decrease in pressure from multiple watering cycles, grit that does not become fully dislodged during initial post-blockage cycles will tend to be dislodged in subsequent cycles.

In the unlikely event of a catastrophic failure rendering the emitter 10 inoperable, the emitter 10 can be easily replaced without the need to replace the entire water supply conduit.

While the invention has been described with respect to specific examples, including presently preferred modes of carrying out the invention, those skilled in the art will appreciate that there are numerous variations and permutations of the above described apparatuses and methods that fall within the spirit and scope of the invention as set forth in the appended claims.

What is claimed is:

1. An irrigation apparatus comprising:
   an outlet component having a first outlet portion for emitting low flow and defining a valve cavity and at least one metering groove;
   an inlet component having a first inlet portion for connecting to a supply conduit and a second inlet portion for engagement and attachment to the outlet component wherein the inlet component includes a tubular member extending away from the first portion wherein the tubular member includes an open end; and
   a valve component having a tubular body received in the valve cavity and cooperating with the outlet component to form an elongated flow path and having a first valve portion fixed relative to the outlet component and the inlet component and a second valve portion that shifts relative to the outlet component and inlet component to contract flow through the first inlet portion and the first outlet portion, the valve component being disposed generally about the tubular member of the inlet component.

2. The irrigation apparatus of claim 1 wherein the tubular body includes an end wall portion that is naturally biased against the open end of the tubular member to form a valve.

3. The irrigation apparatus of claim 2 wherein the end wall portion is spaced from the open end of the tubular member when fluid pressure within the tubular member has exceeded a predetermined level such that fluid flows through the open end of the tubular member and into a pressure chamber defined at least in part by the tubular member and the valve component.

4. The irrigation apparatus of claim 3 wherein the valve component further includes at least one inlet port that creates fluid communication between the pressure chamber and the flow channel and the valve component is further configured to expand radially as fluid pressure increases in the pressure chamber so that the flow path constricts, and wherein the valve component is further configured to return toward a natural state as fluid pressure decreases.

5. The irrigation apparatus of claim 4 wherein the valve component is further configured to repeatedly expand radially as fluid pressure increases and retract to the natural state as fluid pressure decreases so that any foreign matter in the flow path will be dislodged by the expansion and retraction to cause the foreign matter to flow downstream.

6. The irrigation apparatus of claim 2 wherein the outlet component includes a first annular portion having a plurality of grooves and a second annular portion radially inside of the first annular portion and having the at least one metering groove.

7. The irrigation apparatus of claim 6 wherein the outlet component includes an annular groove disposed between the first annular portion and the second annular portion.

8. The irrigation apparatus of claim 7 wherein the valve component has an expanded position where the valve component engages the first annular portion and the second annular portion such that fluid passes through the plurality of grooves in the first annular portion for filtering, then into the annular groove, and then through the at least one metering groove in the second annular portion for metering.

9. The irrigation apparatus of claim 7 wherein the valve component has an intermediate position where the end wall portion is spaced from the open end of the tubular member and is spaced from the first annular portion and the second annular portion such that fluid passes over the first annular portion and the second annular portion for flushing.

10. The irrigation apparatus of claim 7 wherein the valve component has a retracted position where the end wall portion being in engagement with the open end of the tubular member such that fluid is at least substantially restricted from passing into the pressure chamber.

11. The irrigation apparatus of claim 6 wherein the second annular portion has at least two metering grooves.

12. The irrigation apparatus of claim 1 wherein the elongated flow path comprises an elongated tortuous flow path.

\* \* \* \* \*